(12) United States Patent
Benedict et al.

(10) Patent No.: US 12,444,818 B2
(45) Date of Patent: Oct. 14, 2025

(54) MONOLITHIC WAVEGUIDE AND SUPPORTING WAVEGUIDE BRIDGE

(71) Applicant: Raytheon Company, Arlington, VA (US)

(72) Inventors: James Benedict, Chelmsford, MA (US); Lawrence A. Binek, Glastonbury, CT (US); Erika Klek, Medford, MA (US)

(73) Assignee: Raytheon Company, Arlington, VA (US)

( * ) Notice: Subject to any disclaimer, the term of this patent is extended or adjusted under 35 U.S.C. 154(b) by 340 days.

(21) Appl. No.: 18/072,539

(22) Filed: Nov. 30, 2022

(65) Prior Publication Data

US 2023/0216166 A1 Jul. 6, 2023

Related U.S. Application Data

(60) Provisional application No. 63/295,447, filed on Dec. 30, 2021.

(51) Int. Cl.
*H01P 1/208* (2006.01)
*B29C 64/245* (2017.01)
(Continued)

(52) U.S. Cl.
CPC .......... *H01P 1/2088* (2013.01); *B29C 64/245* (2017.08); *B29C 64/336* (2017.08);
(Continued)

(58) Field of Classification Search
CPC ...... H01P 1/2088; H01P 11/007; H01P 1/208; B29C 64/245; B29C 64/336; B33Y 10/00;
(Continued)

(56) References Cited

U.S. PATENT DOCUMENTS

| 3,811,101 A | 5/1974 | Karp |
| 10,490,899 B2 | 11/2019 | Wilson et al. |

(Continued)

FOREIGN PATENT DOCUMENTS

| CN | 107155313 A | * 9/2017 | ........... C04B 35/634 |
| CN | 209389219 U | 9/2019 | |

(Continued)

OTHER PUBLICATIONS

Calignano et al., Accuracy of complex internal channels produced by laser powder bed fusion process, Journal of Manufacturing Processes, Jun. 2020, 2 pages, vol. 54, Elsevier, Netherlands.

(Continued)

*Primary Examiner* — Andrea Lindgren Baltzell
*Assistant Examiner* — Kimberly E Glenn
(74) *Attorney, Agent, or Firm* — Schwegman Lundberg & Woessner, P.A.

(57) ABSTRACT

A radio frequency (RF) waveguide comprising a channel, a filter, and a support bridge. The channel can comprise an outer wall defining an inner cavity configured to propagate electromagnetic waves. The filter can be disposed in the inner cavity of the channel and can comprise a perimeter edge and an aperture. The support bridge can comprise a first interface connected to an inner surface of the outer wall at a first location, and a second interface connected to the filter at a position between the perimeter edge and the aperture of the filter to support the filter within the channel. The support bridge can remain in place as connected to the filter, and the filter and waveguide can operate without interference from the support bridge, meaning that the waveguide meets all performance specifications and functions as intended for a particular application even with the support bridge left in place.

11 Claims, 14 Drawing Sheets

(51) Int. Cl.
    *B29C 64/336* (2017.01)
    *B33Y 10/00* (2015.01)
    *B33Y 30/00* (2015.01)
    *B33Y 80/00* (2015.01)
    *H01P 11/00* (2006.01)
    *B29L 11/00* (2006.01)

(52) U.S. Cl.
    CPC ............... *B33Y 10/00* (2014.12); *B33Y 30/00* (2014.12); *B33Y 80/00* (2014.12); *H01P 11/007* (2013.01); *B29L 2011/0075* (2013.01)

(58) Field of Classification Search
    CPC . B33Y 30/00; B33Y 80/00; B29L 2011/0075; Y02P 10/25
    USPC ........................................................ 333/212
    See application file for complete search history.

(56) References Cited

U.S. PATENT DOCUMENTS

| | | | |
|---|---|---|---|
| 10,573,949 | B2 | 2/2020 | Fluitt et al. |
| 10,833,382 | B2 | 11/2020 | Sysouphat |
| 10,862,186 | B2 | 12/2020 | De Rijk et al. |
| 10,985,448 | B2 | 4/2021 | Bongard et al. |
| 11,031,669 | B2 | 6/2021 | De Rijk et al. |
| 11,128,034 | B2 | 9/2021 | Hollenbeck et al. |
| 2019/0190161 | A1 | 6/2019 | Hollenbeck et al. |
| 2020/0194860 | A1 | 6/2020 | Hollenbeck et al. |
| 2020/0274215 | A1 | 8/2020 | Morris et al. |
| 2020/0373642 | A1 | 11/2020 | Aston et al. |

FOREIGN PATENT DOCUMENTS

| | | | | |
|---|---|---|---|---|
| CN | 107155313 B | * | 11/2020 | ......... B01D 71/0215 |
| FR | 3087954 A1 | | 5/2020 | |
| KR | 102569509 B1 | * | 8/2023 | .............. H01P 1/205 |
| WO | WO 2017/203568 A1 | | 11/2017 | |
| WO | WO 2021/005554 A1 | | 1/2021 | |
| WO | WO 2021/009667 A1 | | 1/2021 | |
| WO | 2023129326 | | 7/2023 | |

OTHER PUBLICATIONS

Calignano et al., High-performance microwave waveguide devices produced by laser powder bed fusion process, Procedia CIRP, 2019, pp. 85-88, vol. 79, Elsevier, Netherlands.

"International Application Serial No. PCT US2022 051442, Written Opinion mailed Apr. 3, 2023", 9 pgs.

Shen et al., Additive Manufacturing of Complex Millimeter-Wave Waveguides Structures Using Digital Light Processing, IEEE Transactions on Microwave Theory and Techniques, Mar. 1, 2019, pp. 883-895, vol. 67, No. 3, Institute of Electrical and Electronics Engineers, Piscataway, New Jersey.

International Search Report for International Application No. PCT/US2022/051442 dated Apr. 3, 2023, 15 pages.

\* cited by examiner

MONOLITHIC WAVEGUIDE AND SUPPORTING WAVEGUIDE BRIDGE

RELATED APPLICATIONS

This application claims the benefit of U.S. Provisional Patent Application Ser. No. 63/295,447, filed Dec. 30, 2021, which is incorporated by reference in its entirety herein.

BACKGROUND

Radio frequency waveguides used to receive and propagate electromagnetic radio waves are found in a variety of applications in modern society. Traditionally, waveguides have been manufactured using casting and other manufacturing processes to produce multiple parts that are subsequently assembled using welding, brazing, fasteners, and/or gaskets to form a single waveguide. Small scale waveguides have begun to be manufactured using additive manufacturing (e.g., 3D printing). However, large format 3D printers present challenges to manufacturing large format waveguides (e.g., C-Band waveguides) using additive manufacturing due to challenges with manufacturing defects, surface roughness, and stitching errors created in waveguides made with large format printers containing multiple print sources for producing 3D printed waveguides.

For example, due to their larger scale, large format waveguides can be more susceptible to manufacturing defects than smaller scale waveguides such as warping of downward facing surfaces during manufacturing. Often, internal support structures are used in smaller scale waveguides during manufacturing in order to support surfaces and structures of the waveguides that can be particularly susceptible to manufacturing defects during the additive manufacturing process. However, to avoid interfering with the waveguide's operation, such internal support structures have typically been required to be removed after manufacturing by an additional material removal process, thereby increasing cost, complexity, and time of manufacturing waveguides, as well as opportunities for defects to form in the waveguide.

Additionally, large format printers can use multiple print sources (e.g., inkjets, binding jets, extruders, lasers, electron beams, or other heating devices used in powder bed fusion additive manufacturing) to form an additively manufactured waveguide. Misalignment of the multiple print sources can lead to incorrect and/or incomplete forming of parts in a stitch region where printing ranges of the print sources overlap each other. For example, if the overlapping print sources are misaligned, multiple print sources can print in an area where only one print source is intended to form the part, leading to an unintended excess of material and deformation of the part in the misaligned sections. Alternatively, all of the print sources can fail to properly form the waveguide in a certain area due to the misalignment, thereby leaving unintended gaps and spaces in the waveguide walls that can adversely affect the performance of the waveguide.

Due to the above problems in large format additive manufacturing of waveguides, new designs of large format waveguides and new methods for manufacturing large format waveguides continue to be sought to decrease lead times, costs, and complexity, and to ensure reliable performance and manufacture of such large format waveguides.

SUMMARY

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein are examples of various configurations of the teachings contained herein. Although the disclosure may not expressly disclose that some examples or features described herein may be combined with other examples or features described herein, this disclosure should be read to describe any such combinations that would be practicable by one of ordinary skill in the art. Furthermore, the described features, structures, or characteristics may be combined in any suitable manner in one or more examples described herein.

Example 1 is a waveguide manufactured by additive manufacturing. The waveguide can comprise a channel, and a filter and a support bridge supported within the channel. The channel can comprise an outer wall defining an inner cavity configured to propagate electromagnetic waves. The filter can be disposed in the inner cavity of the channel and can comprise a perimeter edge and an aperture. The support bridge can comprise a first interface connected to an inner surface of the outer wall at a first location, and a second interface connected to the filter at a position between the perimeter edge and the aperture of the filter to support the filter within the channel. During use of the waveguide, the support bridge can remain in place as connected to the filter, and the filter can operate without interference from the support bridge, meaning that the support bridge can be formed within the RF waveguide, such that the RF waveguide meets all performance specifications and functions as intended for a particular application even with the support bridge left in place.

Example 2 is a waveguide according to example 1, wherein the waveguide is monolithic.

Example 3 is a waveguide according to any of examples 1 and 2, wherein the filter is an iris filter comprising a plate with the aperture formed therein, wherein the second interface of the support bridge is connected to the plate.

Example 4 is a waveguide according to any of examples 1 through 3, further comprising a transition surface formed between the first interface and the inner surface, and a transition surface formed between the second interface and the filter.

Example 5 is a waveguide according to any of examples 1 through 4, wherein the support bridge further comprises a third interface connected to the inner surface of the outer wall at a second location.

Example 6 is a waveguide according to any of examples 1 through 5, wherein the filter operates without interference from the support bridge, meaning that the support bridge can be formed within the RF waveguide, such that the RF waveguide meets all performance specifications and functions as intended for a particular application even with the support bridge left in place.

Example 7 is a waveguide according to any of examples 1 through 6, further comprising a transition surface formed between the third interface and the inner surface.

Example 8 is a waveguide according to any of examples 1 through 7, wherein the channel comprises a substantially rectangular cross section, the outer wall comprising four sides configured in a rectangular shape.

Example 9 is a waveguide according to any of examples 1 through 8, further comprising a plurality of support bridges, including the support bridge, each comprising a first interface connected to an inner surface of the outer wall at respective locations, and a second interface connected to the filter at a position between the perimeter edge and the aperture of the filter to support the filter within the channel, wherein the plurality of support bridges are offset from one another.

Example 10 is a waveguide according to any of examples 1 through 9, wherein the support bridge is substantially chevron shaped.

Example 11 is a waveguide according to any of examples 1 through 10, wherein the wave guide is manufactured by additive manufacturing by an additive manufacturing system.

Example 12 is a waveguide according to any of examples 1 through 11, wherein the additive manufacturing system comprises two or more print sources that each print in a region common to the two or more print sources. The waveguide can further comprise forming a band around the outer wall that is disposed in a stitch region of the waveguide that is configured to be printed in the region common to the two or more print sources by the additive manufacturing system.

Example 13 is a method for additively manufacturing any of the example waveguides 1 through 12 above utilizing an additive manufacturing system. The method can comprise providing a build plate comprising a base, and one or more build surfaces extending from the base (e.g., the build surfaces can be oriented on an angle relative to the base). The method can further comprise successively layering material on the build plate in a build direction normal to a surface of the base. The method can further comprise forming the channel comprising an outer wall defining an inner cavity configured to propagate electromagnetic waves. The method can further comprise forming the filter disposed in the inner cavity of the channel, the filter comprising a perimeter edge, an aperture, and a downward facing surface relative to the base of the build plate. The method can further comprise forming the support bridge comprising a first interface connected to an inner surface of the outer wall at a first location, and a second interface connected to the filter at a position between the perimeter edge of the filter and the aperture in the filter to support the downward facing surface of the filter within the channel.

Example 14 includes the method of example 13, wherein the additive manufacturing system comprises two or more print sources that each print in a region common to the two or more print sources. The method can further comprise forming a band around the outer wall in a stitch region of the waveguide that is configured to be printed in the region common to the two or more print sources.

Example 15 is the method of any of examples 11 and 14, wherein the one or more build surfaces are oriented at 45 degrees with respect to the base.

Example 16 is the method of any of examples 11 through 15, further comprising forming the support bridge to remain in place during operation of the waveguide.

Example 17 is the method of any of examples 11 through 16, further comprising forming a plurality of support bridges, including the support bridge, each comprising a first interface connected to an inner surface of the outer wall at respective locations, and a second interface connected to the filter at a position between the perimeter edge and the aperture of the filter to support the filter within the channel, wherein the plurality of support bridges are offset from one another.

Example 18 is the method of any of examples 11 through 17, wherein the waveguide is monolithic.

Example 19 is the method of any of examples 11 through 18, wherein the filter is an iris filter comprising a plate with the aperture formed therein and the second interface of the support bridge is connected to the plate.

Example 20 is the method of any of examples 11 through 19, further comprising configuring the support bridge to further comprise a third interface connected to the inner surface of the outer wall at a second location.

Example 21 is the method of any of examples 11 through 20, further comprising forming a transition surface between the first interface and the inner surface, and a transition surface between the second interface and the filter.

Example 22 is the method of any of examples 11 through 21, further comprising forming a transition surface between the third interface and the inner surface.

Example 23 is the method of any of examples 11 through 22, wherein the channel comprises a substantially rectangular cross section, the outer wall comprising four sides configured in a rectangular shape.

Example 24 is the method of any of examples 11 through 23, wherein the support bridge is substantially chevron shaped.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1B illustrates a cross-section of a channel of the waveguide of FIG. 1a.

FIG. 2A illustrates a top view of the waveguide of FIG. 1a.

FIG. 2B illustrates a bottom view of the waveguide of FIG. 1a.

FIG. 3A illustrates a first side view of the waveguide of FIG. 1a.

FIG. 3B illustrates a second side view of the waveguide of FIG. 1a.

FIG. 4A illustrates a back view of the waveguide of FIG. 1a.

FIG. 4B illustrates a front view of the waveguide of FIG. 1a.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Figure 1A:
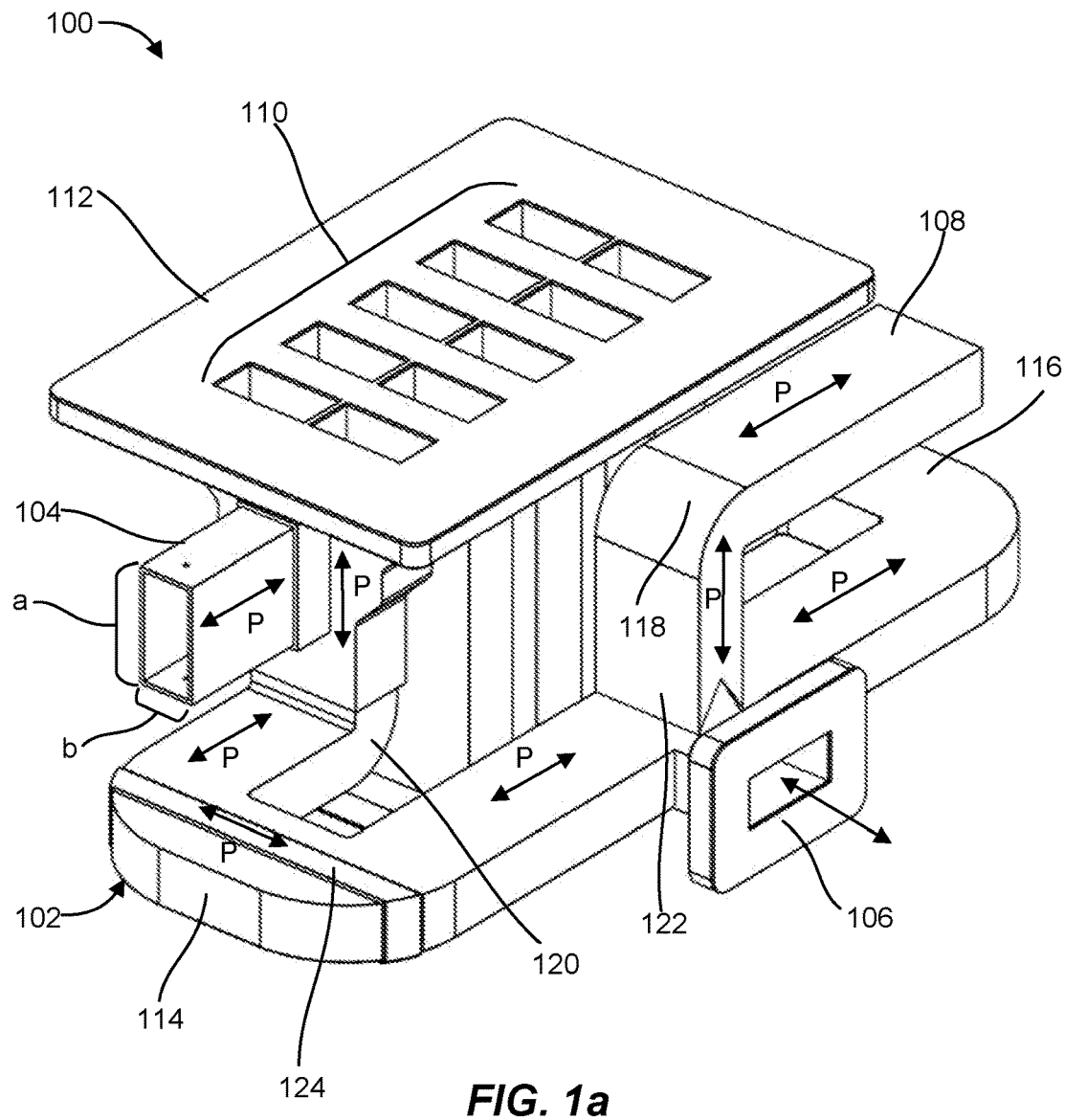
FIG. 1A illustrates an isometric view of a waveguide formed using an additive manufacturing process in accordance with an example of the present disclosure.

To further describe the present technology, examples are now provided with reference to the figures. With reference to FIG. 1a, illustrated is a waveguide 100 configured to be manufactured by additive manufacturing in accordance with an example of the present disclosure. The waveguide 100 can comprise a channel 102 that is hollow and that propagates electromagnetic waves in the radio wave and microwave frequencies (hereinafter collectively referred to as "radio waves" or "radio frequencies" (RF)) of the electromagnetic spectrum therein. The waveguide 100, which can also be referred to as a RF waveguide, can include a series of waveguide features or components forming a continuous channel 102 for propagating radio waves. The waveguide features or components, for example can be exit/entry ports including port 104 formed on a side of the waveguide 100, port 105 formed on a side of the waveguide 100 opposite to port 104, port 106 formed on a front of the waveguide 100, port 108 formed on a side of the waveguide 100, and ports 110 formed in an upper flange 112 of the waveguide 100. The ports 104, 106, 108, and 110 can be in wave or fluid communication with one another through the channel 102 to propagate radio waves throughout the waveguide 100.

The channel 102 can further include u-bends 114 and 116 that turn a path of a wave by 180 degrees, bends 118 and 120 that turn a path of a wave by 90 degrees, and/or a tee junction 122 that branches off or combines waves in multiple directions of the channel 102. The waveguide 100 can further include a thickened band 124 disposed over a portion of the waveguide 100. The band 124 will be described in further detail below with reference to manufacturing of the waveguide 100 using an additive manufacturing system including a plurality of print sources.

It will be understood by those skilled in the art that the principles described herein can be applicable to any waveguide containing any combination of features, bends, junctions, ports, lengths, and/or bands in any number or configuration without departing from the scope of this disclosure. A waveguide formed in accordance with the principles described herein is not intended to be limited in anyway by the example waveguide 100 described herein.

Figure 1B:
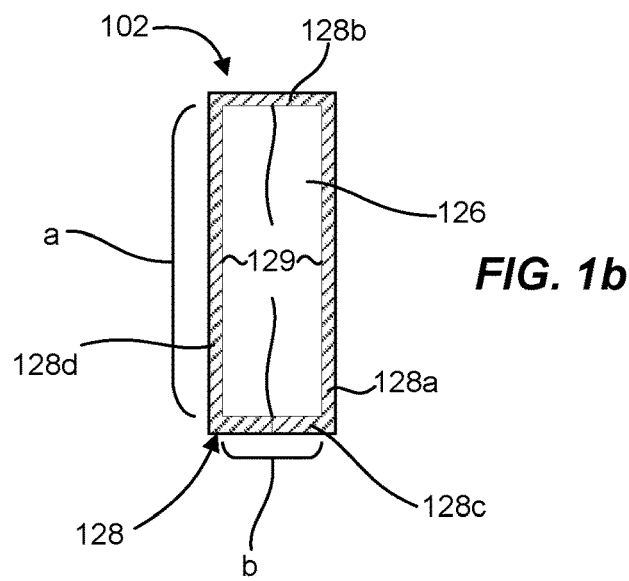

With reference to FIG. 1b, illustrated is a cross section of port 104 illustrating the cross-section of the channel 102. Although the particular cross-section shown is of port 104, cross sections of the channel 102 will look similar anywhere along path P of the waveguide 100. The channel 102 can have a rectangular cross section, as shown in FIG. 1b, along a portion of, or the entire length of the propagation path P of the channel 102.

As illustrated in FIG. 1b, the rectangular cross-section can include a first dimension a, and a second dimension b, which define a height and width of an inner cavity 126 of the channel 102. The ratio of dimension a to dimension b can define an aspect ratio of the channel 102. While dimension a is shown to be larger than dimension b, it is to be understood that the dimensions of the channel 102 are not intended to be limited in anyway. Dimension b can be larger than dimension a, or dimension a and dimension b can be equal to create a square channel 102. The aspect ratio of the channel 102 is not intended to be limited in any way by this disclosure. The inner cavity 126 can be defined by an outer wall 128. The outer wall 128 can comprise a plurality of sides that abut each other including sides 128a, 128b, 128c, and 128d. The sides 128a, 128b, 128c, and 128d together form the outer wall 128 of the channel 102 and define the inner cavity 126. The outer wall 128 can comprise an inner surface 129 through the waveguide 100. Additionally, the cross section of the channel 102 is not limited to rectangular can comprise any known shape or configuration of channel known in the art other than rectangular (e.g., circular, oval, or any other shape of any size or dimension).

Figure 2A:
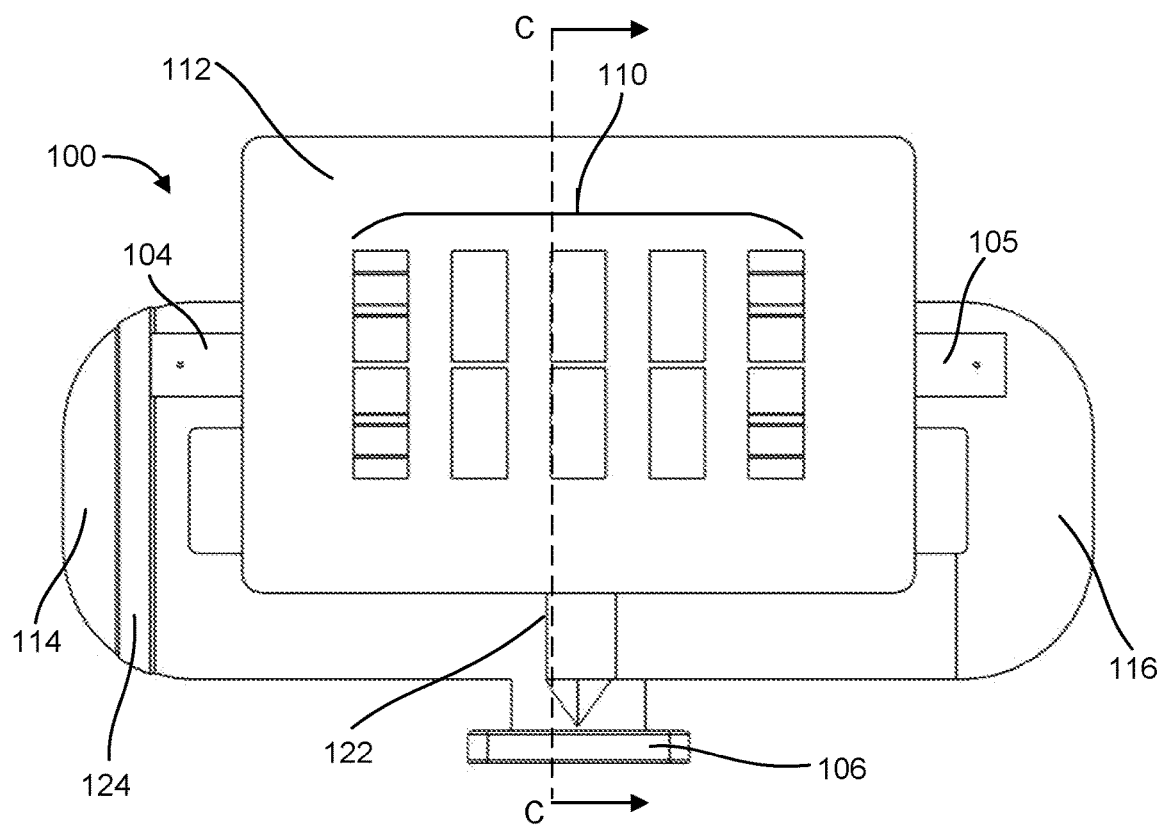
Figure 2B:
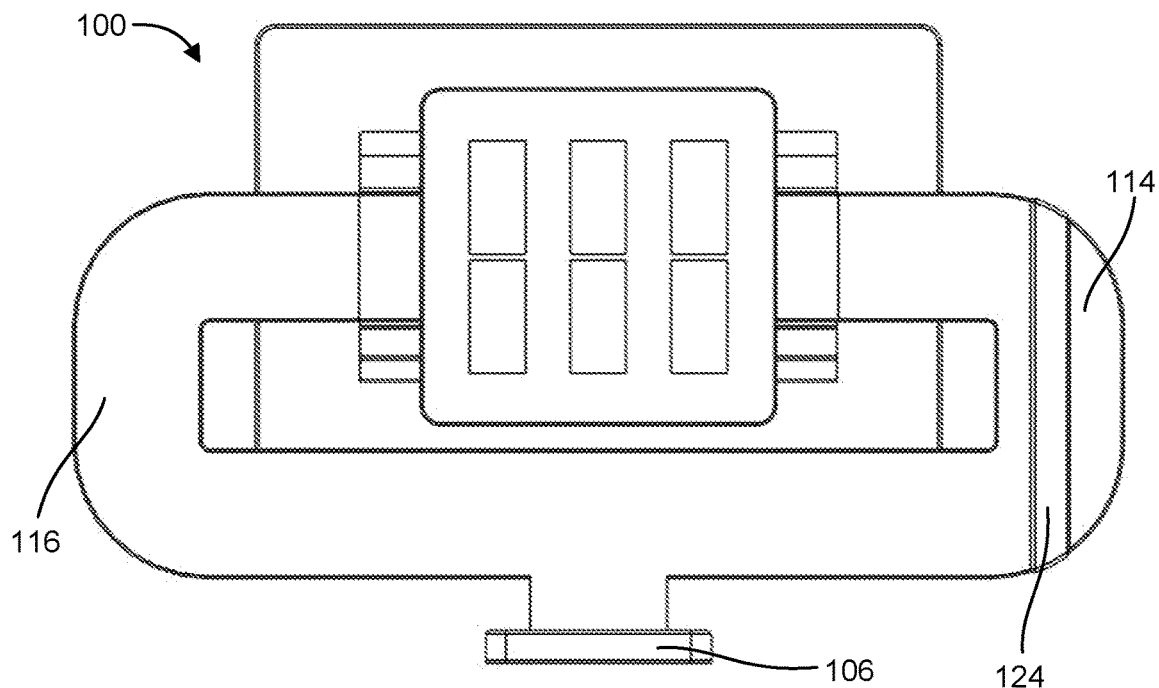
Figure 3A:
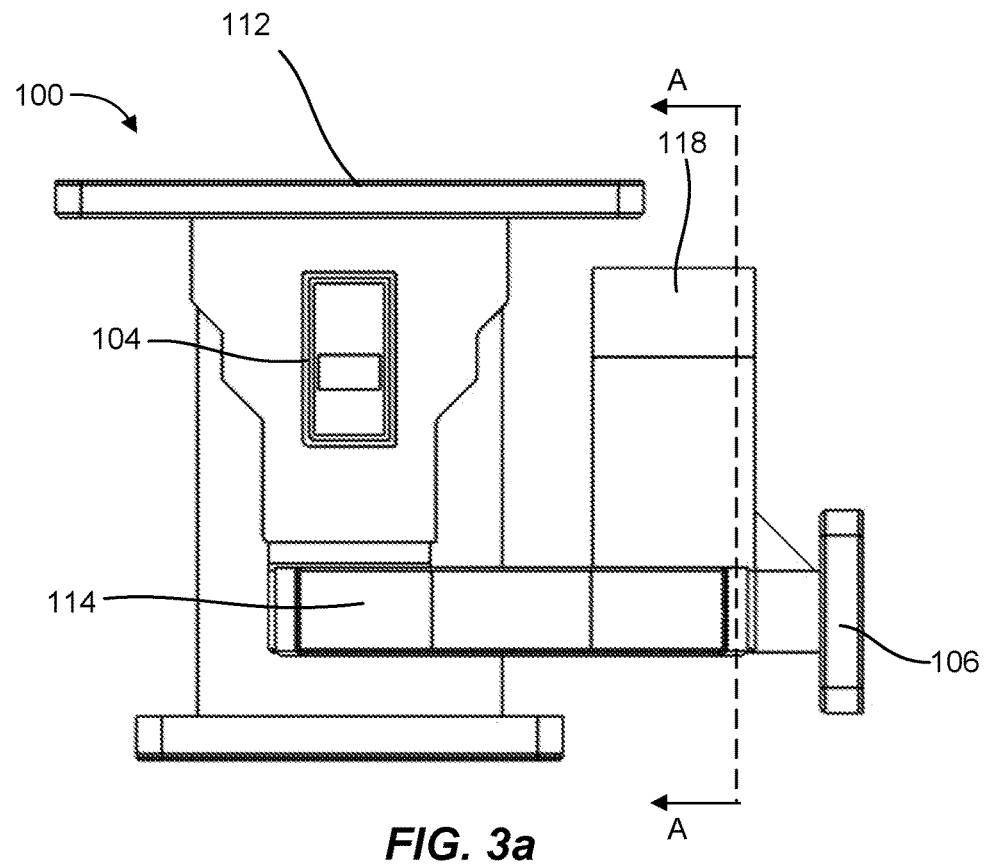
Figure 3B:
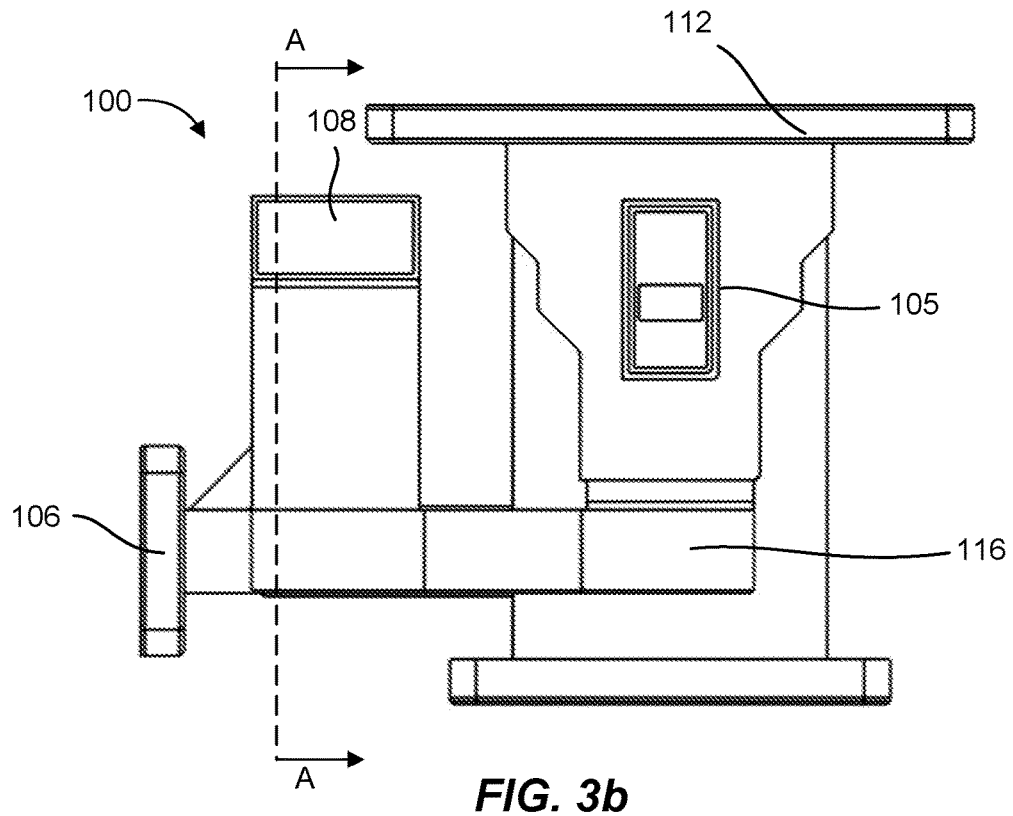
Figure 4A:
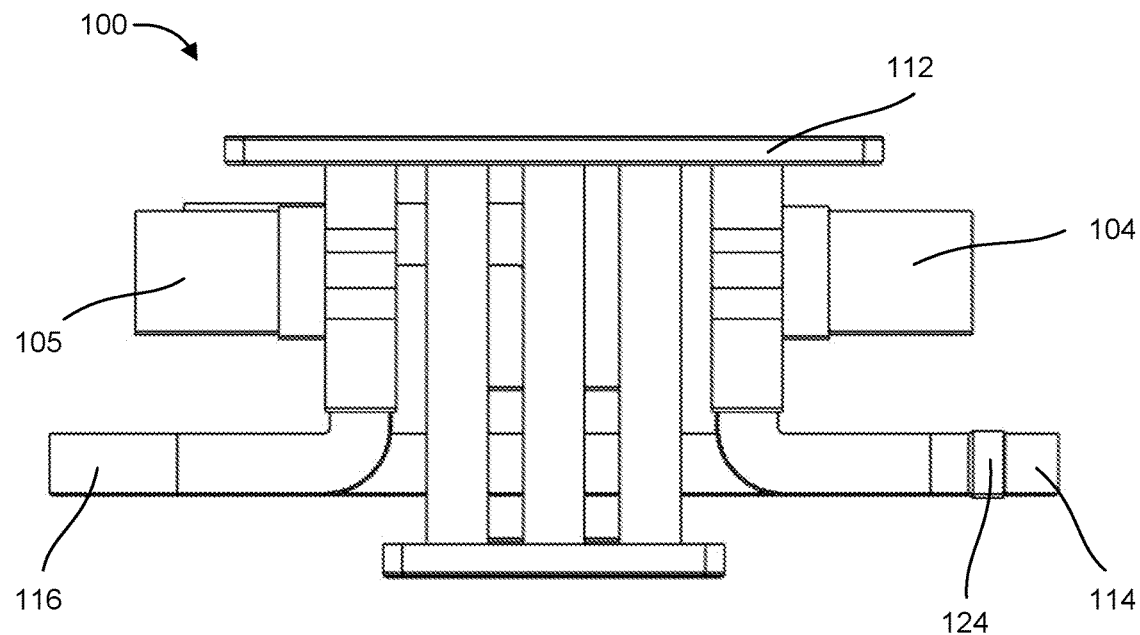
Figure 4B:
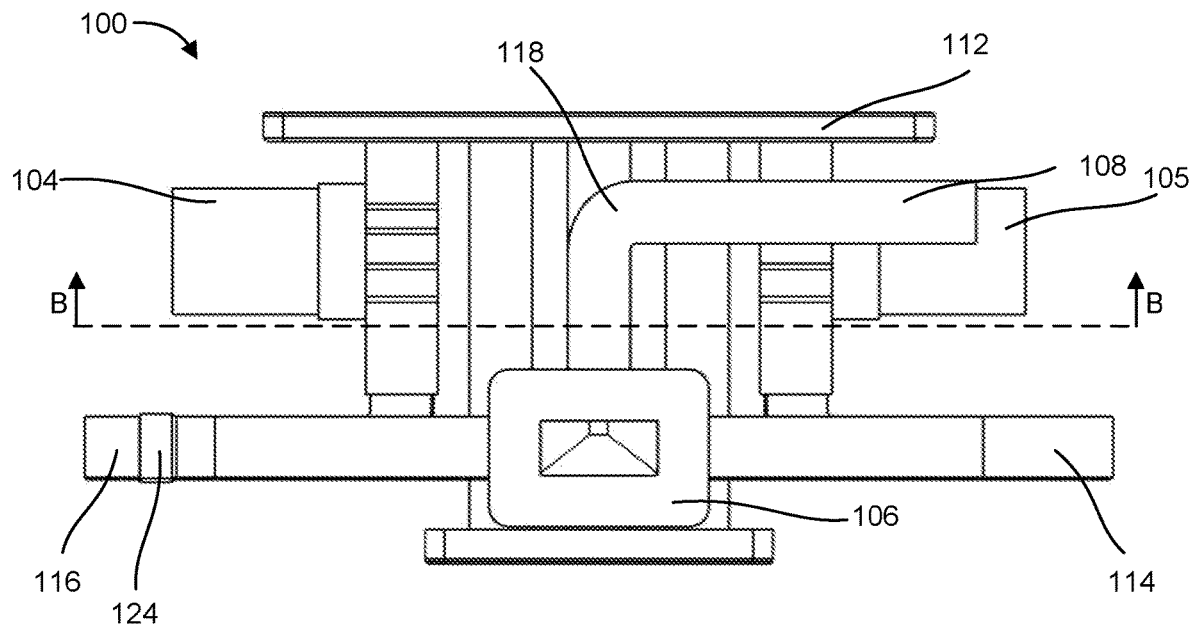

With reference to FIGS. 2a, 2b, 3a, 3b, 4a, and 4b, illustrated are various alternative views of the waveguide 100. FIG. 2a illustrates a top view of the waveguide 100. FIG. 2b illustrates a bottom view of the waveguide 100. FIG. 3a illustrates a side view of the waveguide 100. FIG. 3b illustrates a side view of the waveguide 100. FIG. 4a illustrates a back view of the waveguide 100. FIG. 4b illustrates a front view of the waveguide 100. In all the views of FIGS. 1a, 1b, 2a, 2b, 3a, 3b, 4a, and 4b, the internal configuration of channel 102 is blocked from view by the outer wall 128 of the waveguide 100. In order to explain and describe the internal configuration of the waveguide 100, various cross-sectional views are taken along lines AA, BB, and CC of FIGS. 2a, 3a, 3b, and 4b.

Figure 5A:
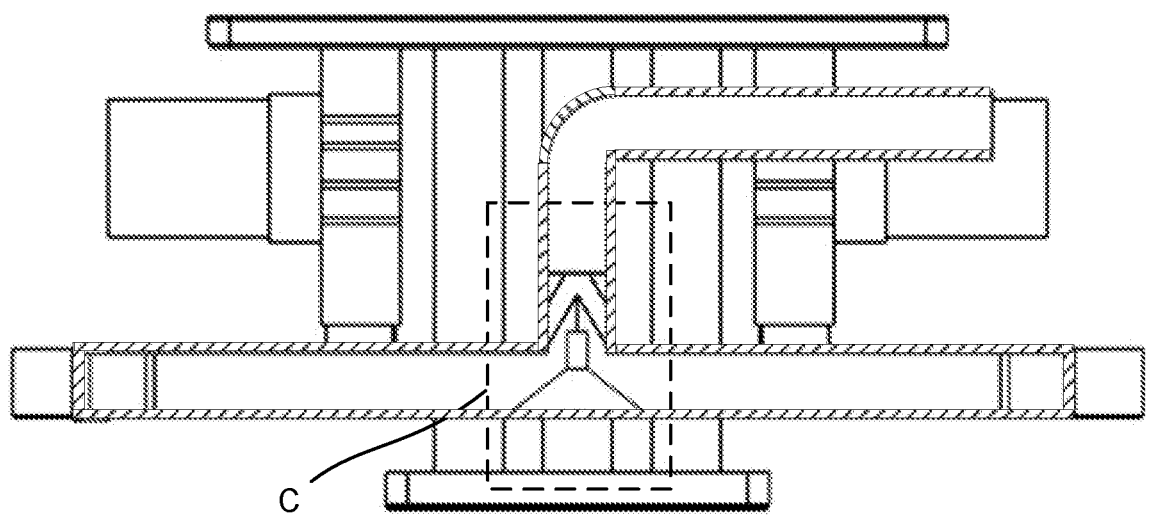
FIG. 5A illustrates a cross-sectional view of the waveguide of FIG. 1a, taken along line A-A of FIGS. 3A and 3B.
Figure 5B:
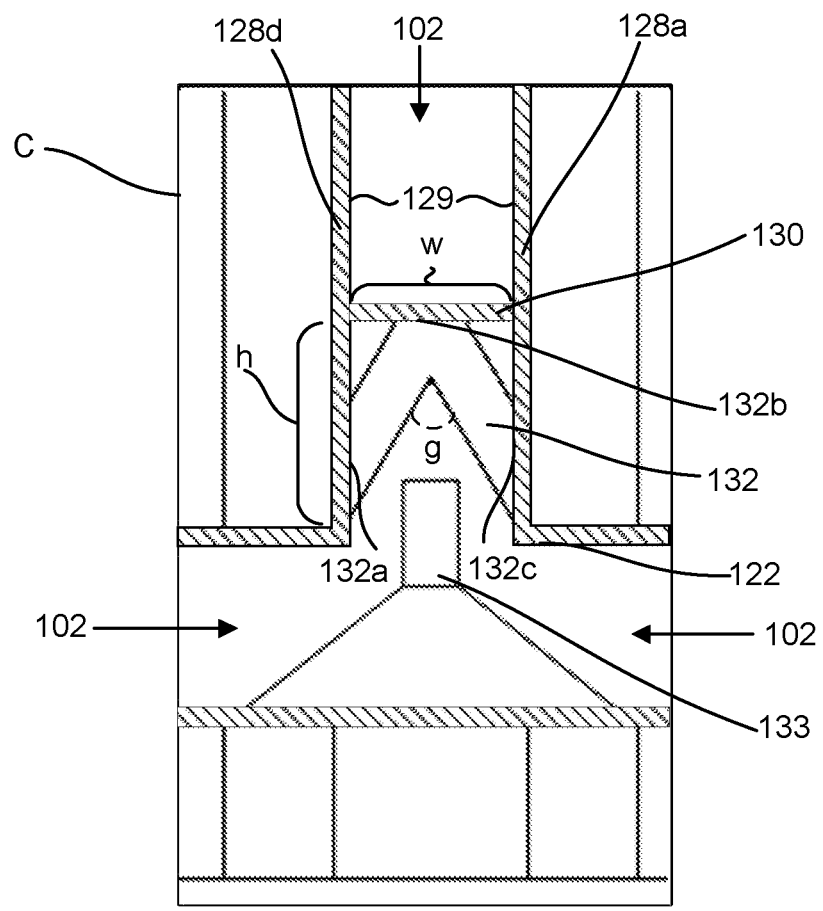
FIG. 5B illustrates a close up cross-sectional view of region C of the waveguide of FIG. 1A, taken along the dotted lines shown in FIG. 5A.

With reference to FIG. 5a, illustrated is a cross-sectional view of the waveguide 100 taken along line AA shown in FIGS. 3a and 3b. FIG. 5b illustrates a close up view of region C of FIG. 5a which illustrates the internal configuration of the tee junction 122 of the waveguide 100 from a front view of the waveguide 100.

As shown in FIG. 5b, disposed within the channel 102 is a filter 130 extending between and supported, at least in part, by sides 128a and 128d of the channel 102. A support bridge 132 is also formed in the channel 102 to support the filter 130 within the channel 102. The support bridge 132 can include a first interface 132a connected to the inner surface 129 of the outer wall 128 at a first location (e.g., the side 128d), a second interface 132b connected to the filter 130, and a third interface 132c connected to the inner surface 129 of the outer wall 128 at a second location (e.g., the side 128a).

As shown, the waveguide 100 can further include a magic tee 133 disposed at an intersection of the tee junction 122. The magic tee 133 can aid in the propagation of radio waves through the waveguide 100, and can particularly aid in the guiding and directioning of radio waves through the tee junction 122.

The support bridge 132 is of a configuration and disposed in such a place that the support bridge 132 can be left in place connected to the filter 130 after manufacturing of the waveguide 100 without interfering with the operation of the filter 130, the magic tee 133, or the waveguide 100 in general, meaning that the support bridge 132 can be formed within the waveguide 100, such that the waveguide 100 meets all performance specifications and functions as intended for a particular application even with the support bridge 132 left in place. Accordingly, with the support bridge 132 configured as described herein, the waveguide 100 can be printed in a single additive manufacturing process to form the waveguide 100 as a single monolithic part without the need for additional post-forming assembly of separate parts.

In this disclosure, the term "monolithic" covers any structure that is printed as a single unitary part using additive manufacturing. The "monolithic" structure (e.g., waveguide) can be a single-material, unitary structure manufactured by an additive manufacturing system capable of printing unitary structures using a single material throughout the entire structure. Additionally, "monolithic" can also refer to a multi-material structure (e.g., waveguide) manufactured by an additive manufacturing system capable of printing a unitary structure using two or more materials to print the structure during a single additive manufacturing process.

Additionally, because the support bridge 132 can remain in place without interfering with the operation of the waveguide 100, or any of its components, no internal support structures within the waveguide 100 need to be removed. Therefore, no post-manufacturing removal processes need to be carried out on the waveguide 100 to remove internal support structures, thereby reducing cost, lead times, manufacturing and complexity of waveguides formed in accordance with the concepts disclosed herein.

The support bridge 132 can be any suitable shape that will not interfere with operation of the waveguide 100. With the three interfaces 132a, 132b, and 132c, the support bridge 132 can be in a substantially chevron shape as illustrated. The chevron can be defined by a height h and a width w, as well as an angle g between arms of the support bridge 132. It is to be understood that the dimensions of the chevron are not intended to be limited in any way by this disclosure. For example, the height h can be larger than the width w, the width w can be larger than the height h, or the width and height can be equal. Likewise, the angle g can be of any desirable measurement. The ratio of h to w can define an aspect ratio of the chevron. The aspect ratio is not intended to be limited in anyway by this disclosure. Additionally, the arms of the chevron shape can have any width or length desired However, this shape and the accompanying disclosure is not intended to be limited in any way. The support bridge 132 can be any suitable shape including triangular, rectangular, square, rounded, or any other suitable shape or configuration, including one having any number of sides and interfaces.

Figure 6A:
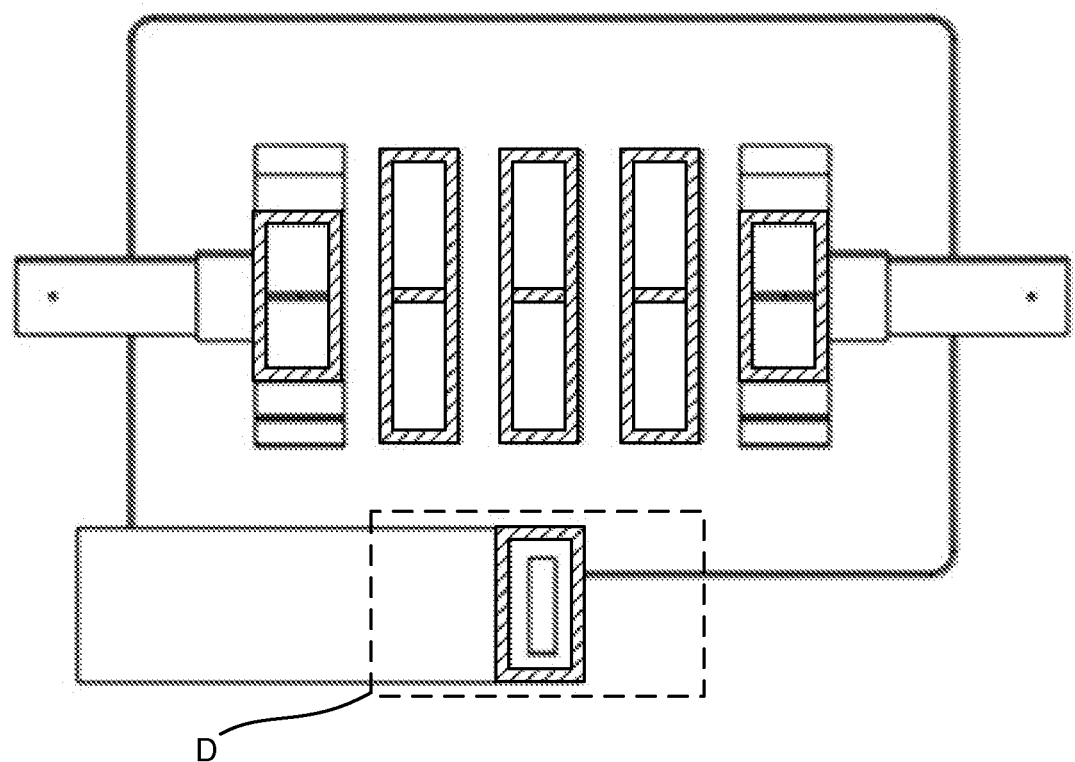
FIG. 6A illustrates a cross-sectional view of the waveguide of FIG. 1A, taken along line B-B of FIG. 4B.
Figure 6B:
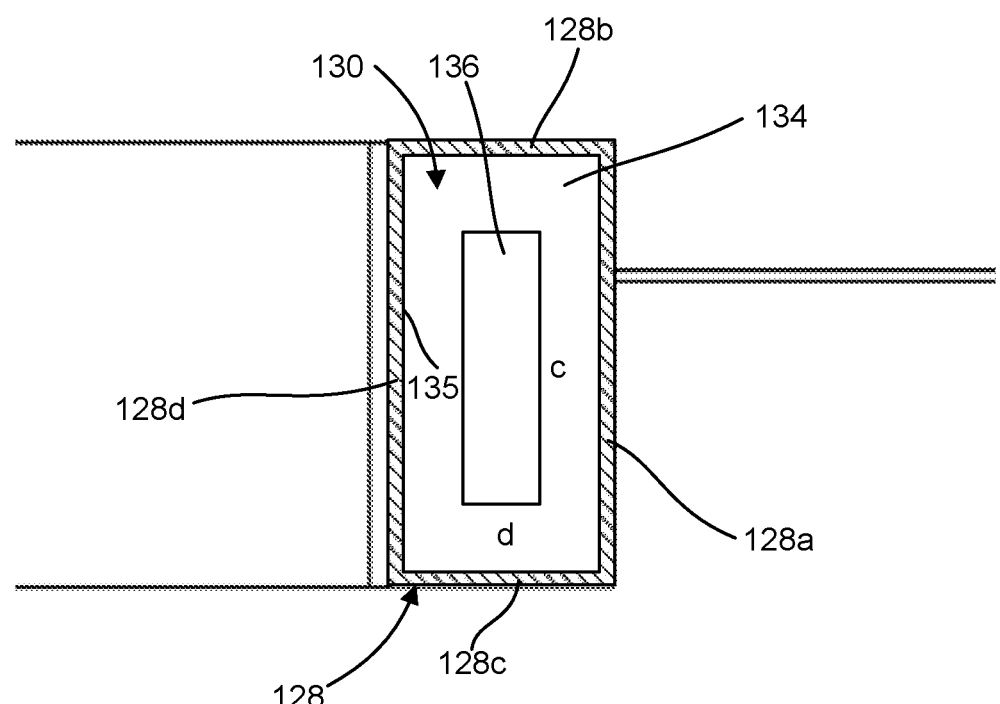
FIG. 6B illustrates a close up cross-sectional view of region D of the waveguide of FIG. 1A, taken along the dotted lines shown in FIG. 6A.

With reference to FIG. 6a, illustrated is a cross-sectional view of the waveguide 100 taken along line BB shown in FIG. 4b. FIG. 6b illustrates a close up view of region D of FIG. 6a, which illustrates the internal configuration of the tee junction 122 of the waveguide 100 from a bottom view of the waveguide 100. As shown in FIG. 6b, the filter 130 can comprise a plate 134 having a perimeter edge 135 that can interface with sides 128a, 128b, 128c, and 128d of the outer wall 128. An aperture 136 can be formed in the plate 134 of filter 130. The filter 136 can be any known filter used in waveguides for filtering out certain types (e.g., polarization, wavelength, or frequency) of radio waves and allowing desired radio waves to pass through the filter 130. The filter 130 shown can be an iris filter with a rectangular aperture formed therein. The rectangular aperture can be defined by a first dimension c, which indicates a length of a first side of the aperture, and a second dimension d, which indicates a length of a second side of the aperture. The ratio of the first dimension c to the second dimension d can define an aspect ratio of the aperture. The dimensions of the aperture are not intended to be limited by this disclosure in anyway. The dimension c can be larger than the dimension d, the dimension d can be larger than the dimension c, or the dimensions c and d can be equal to define a square aperture. Additionally, the aspect ratio of the aperture is not intended to be limited in any way and can be any aspect ratio. However, this particular type of filter and/or filter configuration is not intended to be limited in any way. Any known filter supported in the channel of a waveguide can be used without departing from this disclosure. Additionally, any known shape or configuration of aperture other than rectangular (e.g., circular, oval, or any other shape of any size or dimension) can be formed in the filter without departing from this disclosure.

Figure 7:
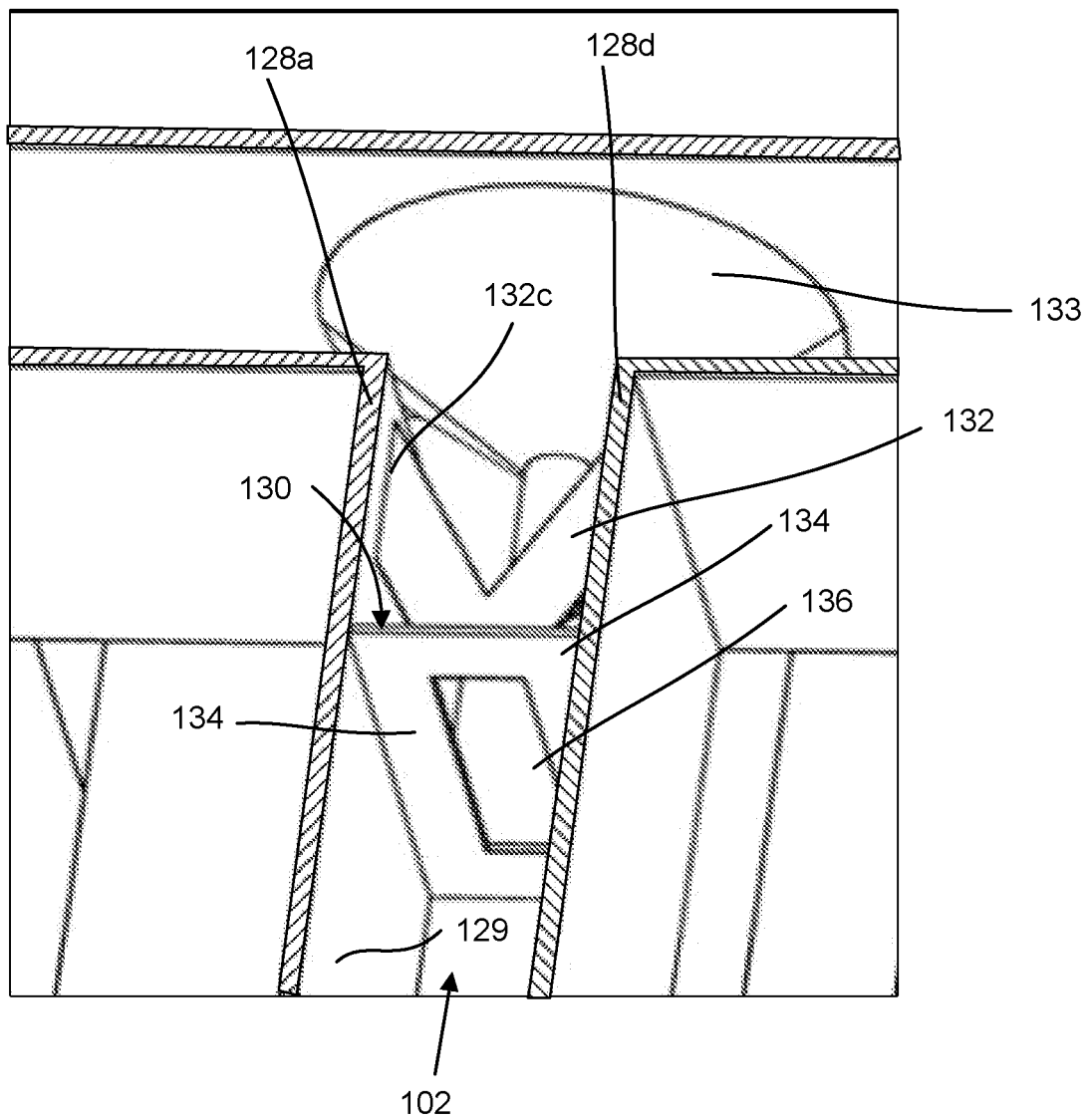
FIG. 7 illustrates a partial perspective view of the waveguide of FIG. 1A with a wall removed to illustrate the internal components of the waveguide.
Figure 8A:
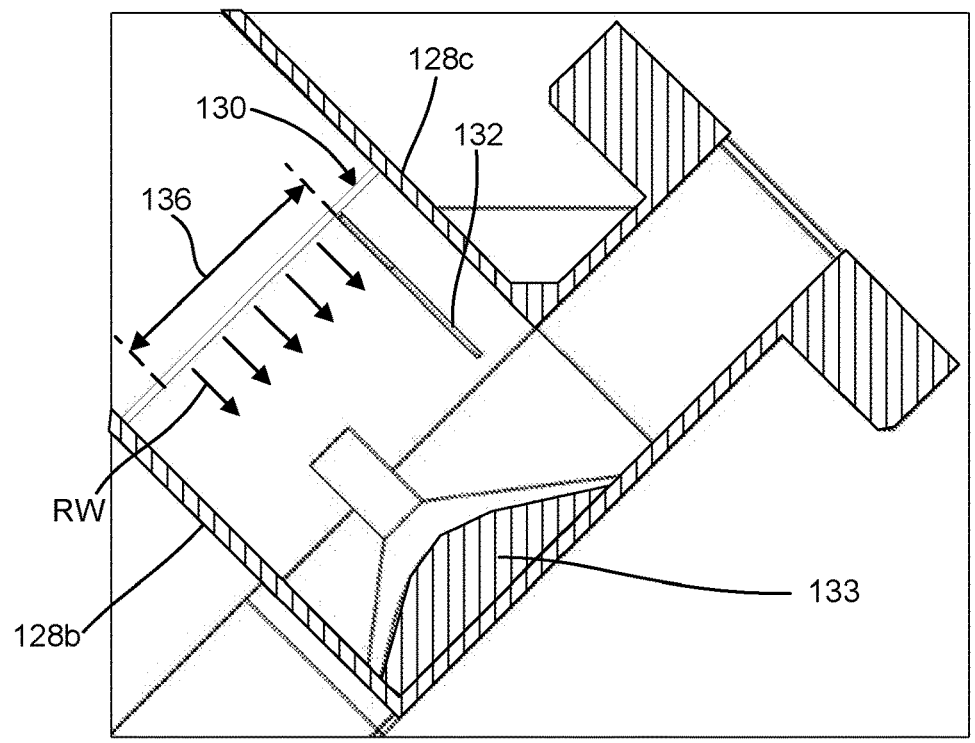
FIG. 8A illustrates a partial side view of the waveguide of FIG. 1A with a wall removed to illustrate the internal components of the waveguide.
Figure 8B:
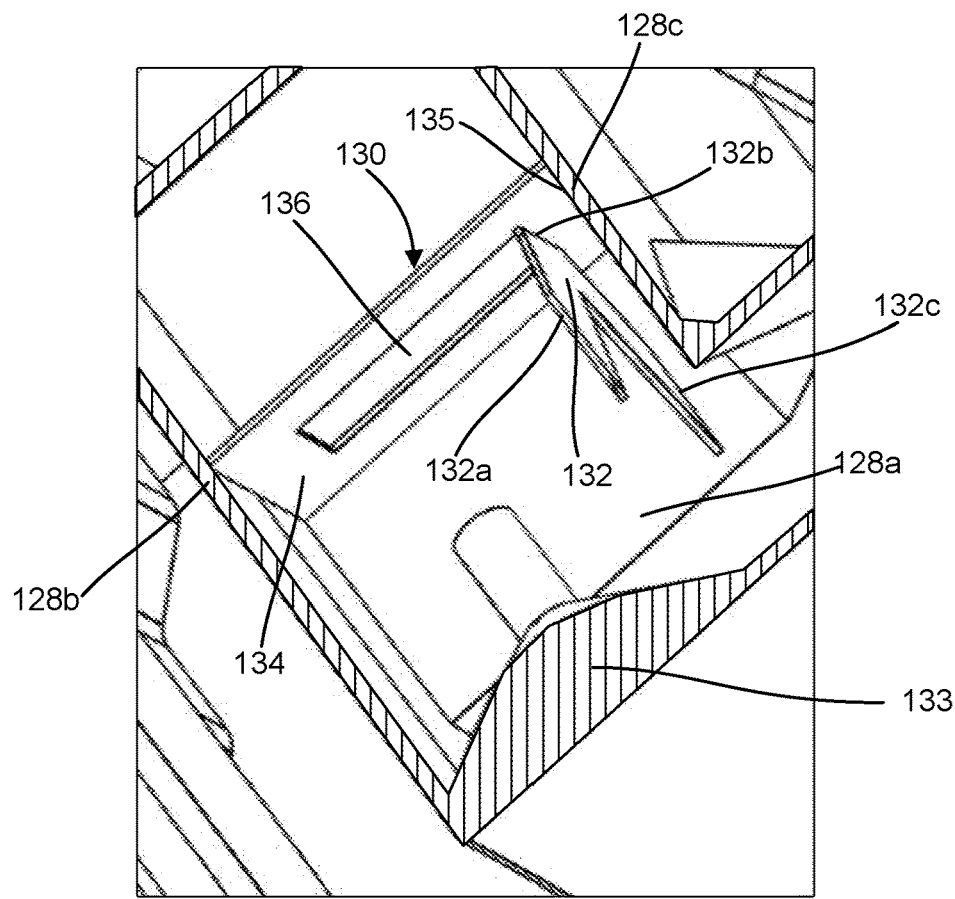
FIG. 8B illustrates a partial perspective view of the waveguide of FIG. 1A with a wall removed to illustrate the internal components of the waveguide.

With reference to FIGS. 7, 8a, and 8b, illustrated are various perspective views of the filter 130 and the support bridge 132 together within the channel 102 of the waveguide 100. FIG. 7 illustrates a perspective view of the cross section of FIG. 5b. As illustrated in FIG. 7, the third interface 132c of the support bridge 132 can be connected to the inner surface 129 of outer wall 128 at side 128a. The first interface 132a of the support bridge 132 can be connected to the inner surface 129 of outer wall 128 at side 128d, and the second interface 132b of the support bridge 132 can be connected with the plate 134 of the filter 130.

FIGS. 8a and 8b are shown at a build orientation of 45 degrees, which will be described later with respect to the manufacturing method for the waveguide 100. For purposes of the current discussion, FIGS. 8a and 8b are provided to illustrate the configuration of and interface between the support bridge 132 and the filter 130 within the waveguide 100. FIG. 8a illustrates a side view of the cross-section of the waveguide 100 taken along line CC of FIG. 2a. FIG. 8b illustrates a perspective view of the cross-section of FIG. 8a. As shown in FIG. 8b, the support bridge 132 can interface with the plate 134 of the filter 130. The first interface 132a can be connected to the inner surface 129 of the outer wall 128 at side 128*d* (shown in FIG. 5*b*), the third interface 132*c* of the support bridge 132 can be connected to the inner surface 129 of the outer wall 128 at side 128*a* (shown in FIG. 8*b*), and the second interface 132*b* can be connected to the plate 134 at a position between the perimeter edge 135 and the aperture 136 of the filter 130 to support the filter 130 within the channel 102.

Figure 9:
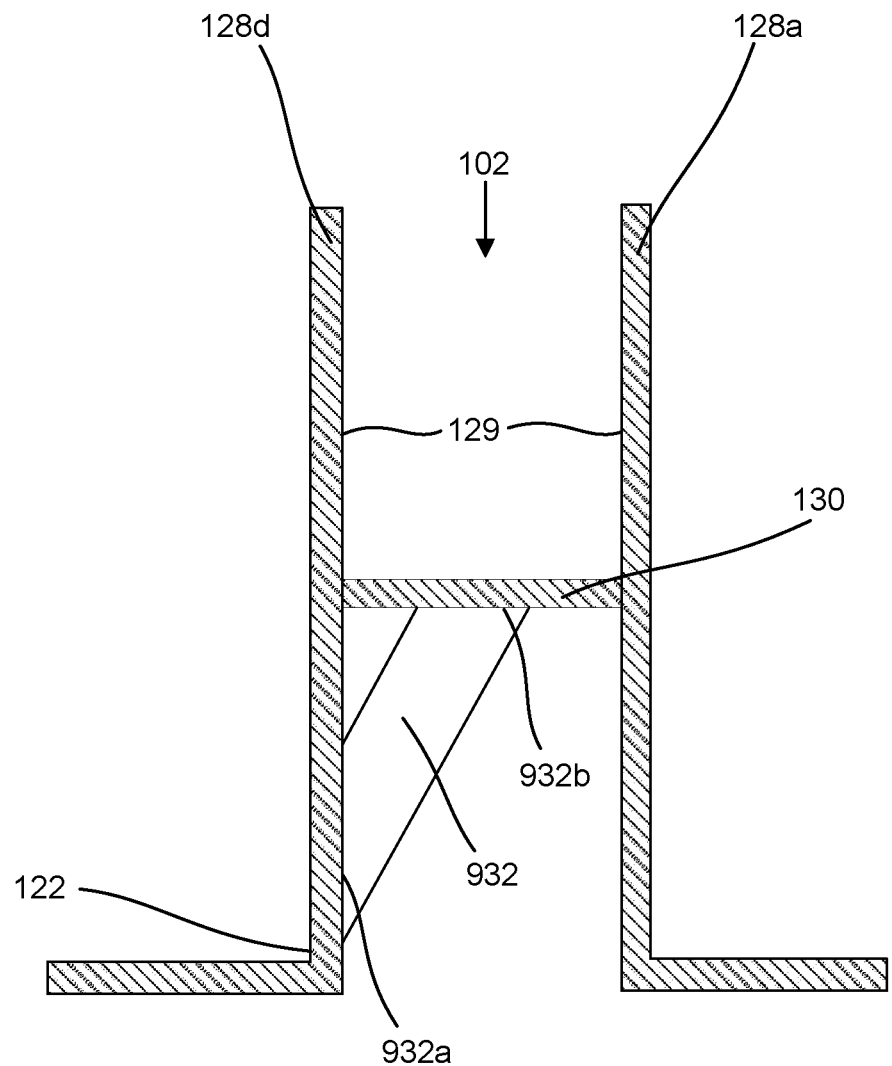
FIG. 9 illustrates a support bridge operable within the waveguide of FIG. 1A in accordance with an alternative example of the present disclosure.

Alternate configurations of the support bridge are contemplated and intended to be within the scope of the present disclosure. With reference to FIG. 9, an alternate support bridge 932 is illustrated. Similar to support bridge 132, support bridge 932 can be placed within the waveguide 100 at any place a filter can be disposed within the channel 102 (e.g., tee junction 122). FIG. 9 illustrates support bridge 932 supporting filter 130 within channel 102. As shown, support bridge 932 can include two interfaces. Interface 932*a* of support bridge 932 can be connected to the inner surface 129 of the channel 102 at side 128*d* and interface 932*b* of support bridge 932 can be connected to can be connected to the plate at a position between the perimeter edge of the filter 130 and the aperture of the filter 130 to support the filter 130 within the channel 102. To save on material and space occupied by the support bridge within the channel 102, the support bridge 932 can include only two interfaces, as described, leading to less surface area and less material used to support the filter 130 during manufacturing and operation of the waveguide.

Figure 10A:
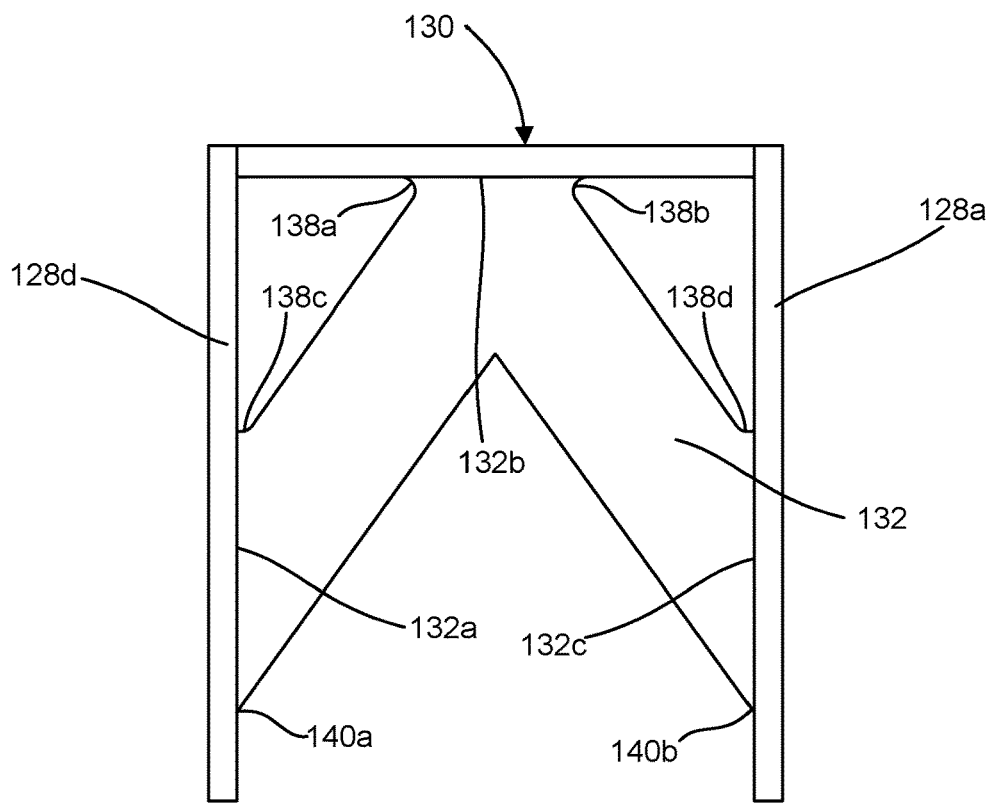
FIGS. 10A, 10B, and 10C respectively illustrate top, side and front views of a support bridge operable within the waveguide of FIG. 1A in accordance with an alternative example of the present disclosure.

Support bridges in accordance with examples of the present disclosure can interface with the filter 130 and the outer wall 128 in a variety of configurations. FIG. 10*a* illustrates a top view of the support bridge 132. As illustrated, the interface 132*b* connected to filter 130 can include a pair of transition surfaces 138*a* and 138*b* formed at the interface 132*b* between the filter 130 and the support bridge 132. Transition surfaces 138*c* and 138*d* can further be formed at interfaces 132*a* and 132*c* between the support bridge 132 and the sides 128*a* and 128*d* of the outer wall 128. While surfaces 140*a* and 140*b* illustrated in FIG. 10*a* do not show rounding or blending with transition surfaces, it is to be understood that transition surfaces can be formed anywhere desired at or along the interfaces 132*a*, 132*b*, and 132*c*.

Figure 10B:
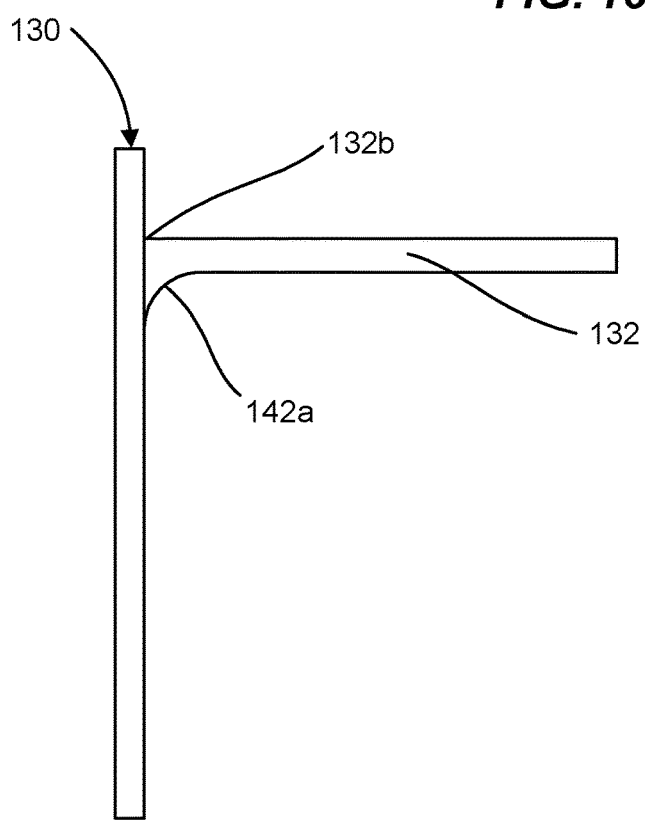
Figure 10C:
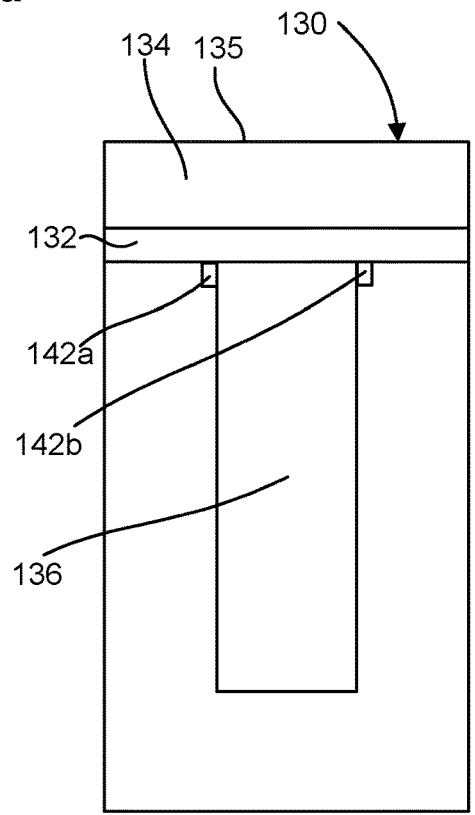

While the transition surfaces are shown formed only in one plane (e.g., the plane of the support bridge 132) in FIG. 10*a*, it is to be appreciated that the transition surfaces can be formed in any plane orientation where the support bridge 132 interfaces with the outer wall 128 or the filter 130. For example, FIGS. 10*b* and 10*c* illustrate transition surfaces 142*a* and 142*b* formed in a plane perpendicular to the plane of the support bridge 132 at the interface 132*b*. FIG. 10*c* further illustrates that transition surfaces 142*a* and 142*b* are formed at positions outside of the aperture 136 on the plate 134 in order to avoid any obstruction with the aperture 136 that can interfere with the operation the filter 132 in the waveguide 100 during operation.

In order to avoid possible surface roughness and manufacturing defects, it is preferable that transitions surfaces, particularly downward facing transition surfaces such as 142*a* and 142*b*, be limited in size since large downward facing transition surfaces can be susceptible to defects. For example, it is preferable that each downward facing transition surface have a radius below two inches. It is further preferable that the radius be between 0.05 and 0.15 inches. However, the disclosure is not intended to limit the size of the transition surface in any way and any size of transition surface is within the scope of this disclosure.

Furthermore, while FIG. 10*b* illustrates that the transition surfaces 142*a* and 142*b* are only formed below the support bridge 132, it is to be appreciated that transition surfaces can be formed on top, on bottom, on the side, or on all sides of the support bridge 132. Any number of transition surfaces can be formed at any positions around interface 132*b*. Additionally, a continuous transition surface can be formed at all parts where an interface meets the outer wall 128 or the plate 134 of the filter 130.

Forming the transition surfaces at any one or more of the interfaces 132*a*, 132*b*, and 132*c* of the support bridge 132 act or function to grade the transition between the support bridge 132 and the filter 130 and the outer wall 128. In additive manufacturing of waveguides, abrupt and sudden changes in surface orientation at interfaces can cause deformations, such as witness lines, surface roughness, or unintended protrusions that can adversely affect the propagation of waves in the waveguide 100 and the overall operation and performance of the waveguide. Adding transition surfaces at abrupt changes in surface orientation mitigates these issues and lessens deformation and manufacturing defects. It will be appreciated that transition surfaces can comprise any of a round, a chamfer, a fillet, or other known transition surface configurations, and any possible combination thereof. As such, the rounds shown in the drawings and discussed herein are not intended to be limited in anyway.

Figure 11A:
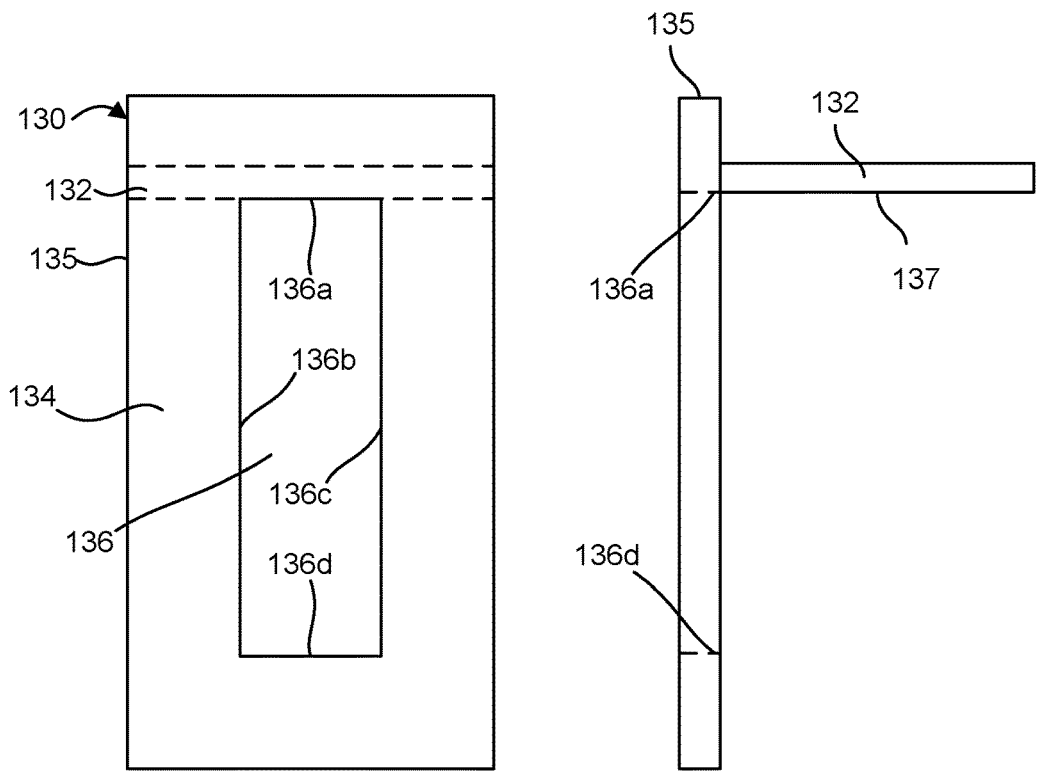
FIG. 11A illustrates front and side views of the filter and the support bridge of the waveguide of FIG. 1A, shown positioned relative to one another.

As described above, the support bridge 132 is disposed or positioned in (i.e., interfaces with the filter 130 at) a location between the aperture 136 and the perimeter edge 135 of the plate 134 of the filter 130. As shown in FIG. 10*c*, no part of the support bridge 132 overlaps with the aperture 136 of the filter 130 when viewed normal to the plate 134. FIG. 11*a* illustrates front and side views of the filter 130 with the support bridge 132 so positioned and in support of the filter 130.

The aperture 136, comprising a hole through the plate 134, can be defined by a plurality of surfaces of the plate 134. The aperture 136 can be defined by an upper surface 136*a*, two side surfaces 136*b* and 136*c*, and a lower surface 136*d*, which in some examples, can be parallel to the upper surface 136*a*. In the example shown, the support bridge 132 can be disposed on the plate 134, such that a bottom surface 137 of the support bridge 132 is positioned outside of the aperture 136 between the aperture 136 and the perimeter edge 135 of the plate 134 of the filter 130. In this example, the bottom surface 137 of the support bridge 132 is substantially aligned with the upper surface 136*a* defining, in part, the aperture 136. Accordingly, the bottom surface 137 of the support bridge 132 and the upper surface 136*a* defining a part of the aperture 136 form one continuous surface, thus providing a smooth uninterrupted surface over which radio waves can propagate without disturbance. The support bridge 132 can be positioned at any position outside of the aperture 136 between the aperture 136 and the perimeter edge 135 of the plate 134 of the filter 130, and is not required to be positioned adjacent or in alignment with the edge or upper surface 136*a* of the aperture 136 as shown in the example.

According to this configuration, radio waves propagating through the aperture 136 are not disturbed or interfered with by the support bridge 132. As shown in FIG. 8*a*, radio waves RW moving through aperture 136 of filter 130 are allowed to flow, unimpeded by the support bridge 132, through aperture 136 and to the magic tee 133. Accordingly, the support bridge 132 being disposed between the aperture 136 and the perimeter edge 135 of the plate 134 of the filter 130 ensures that no interference of the filter 130 or the magic tee 133, and thus no interference of the performance of the waveguide 100, is caused by the support bridge 132. Accordingly, the support bridge 132 can be designed to be left in place after all manufacturing processes are completed, therefore eliminating extra cost and time consumed by post-printing removal processes that would otherwise be employed to remove the support bridge 132.

Figure 11B:
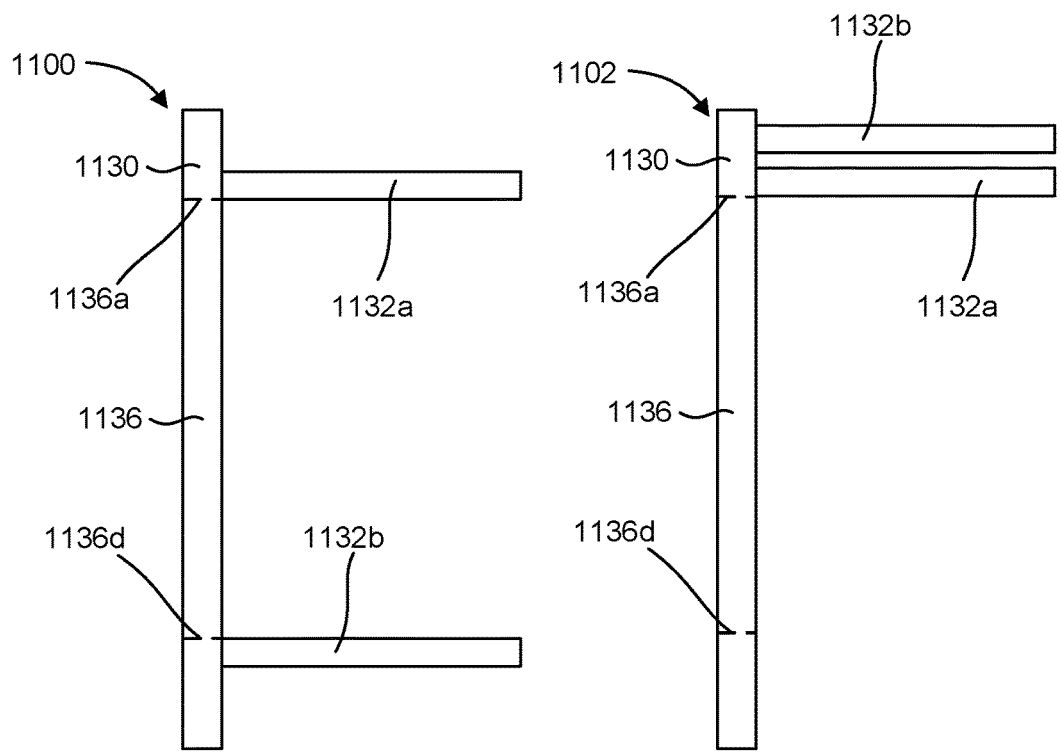
FIG. 11B illustrates alternate configurations of support bridges supporting a filter, these being operable within the waveguide of FIG. 1A in accordance with examples of the present disclosure.

Additional configurations of support bridges are possible within the scope of this disclosure. For example, a plurality of support bridges can be formed to support the filter 130. FIG. 11b illustrates alternative configurations of support bridges on a filter. For example filter assembly 1100 illustrates a configuration where a plurality of support bridges 1132a and 1132b are formed to interface with and support filter 1130, which can comprise the same configuration as the filter 130 discussed above. The filter assembly 1100 can include an upper support bridge 1132a and a lower support bridge 1132b which are both disposed between the aperture 1136 and the perimeter edge of the plate of the filter 1130, and which, in this example, are aligned with one of an upper surface 1136a and a lower surface 1136b of the aperture 1136 in the filter 1130. The upper and lower support bridges 1132a and 1132 can also be referred to as first and second support bridges 1132a and 1132b to avoid confusion as to any orientation relative to one another. Moreover, the support bridges 1132a and 1132b can be configured as any of the support bridges discussed and disclosed herein (or that are based on the concepts disclosed herein).

Filter assembly 1102 illustrates a configuration where a plurality of support bridges 1132a and 1132b are formed to interface with and support filter 1130. The filter assembly 1102 can include a first support bridge 1132a and a second support bridge 1132b which are both positioned on one side of and outside the aperture 1136 in the filter 1130 between the aperture 1136 and the perimeter edge of the filter 1130. The second support bridge 1132b can be offset from the first support bridge 1132a and positioned between the perimeter edge of the filter 1130 and the first support bridge 1132a.

Any number of desired support bridges as described herein can be formed on the filter 1136 to provide support. Additionally, support bridges 1132a and 1132b can each comprise a chevron shaped support bridge, in an example, such as support bridge 132, or a strip-shaped support bridge 932, as another example, or any shaped support bridge according to this disclosure. As described elsewhere in this disclosure, each of the plurality of support bridges can comprise a first interface connected to an inner surface of the outer wall, and a second interface connected to the filter at a position between the perimeter edge and the aperture of the filter to support the filter within the channel. As illustrated in the figures, the plurality of support bridges can be offset from one another.

Figure 12:
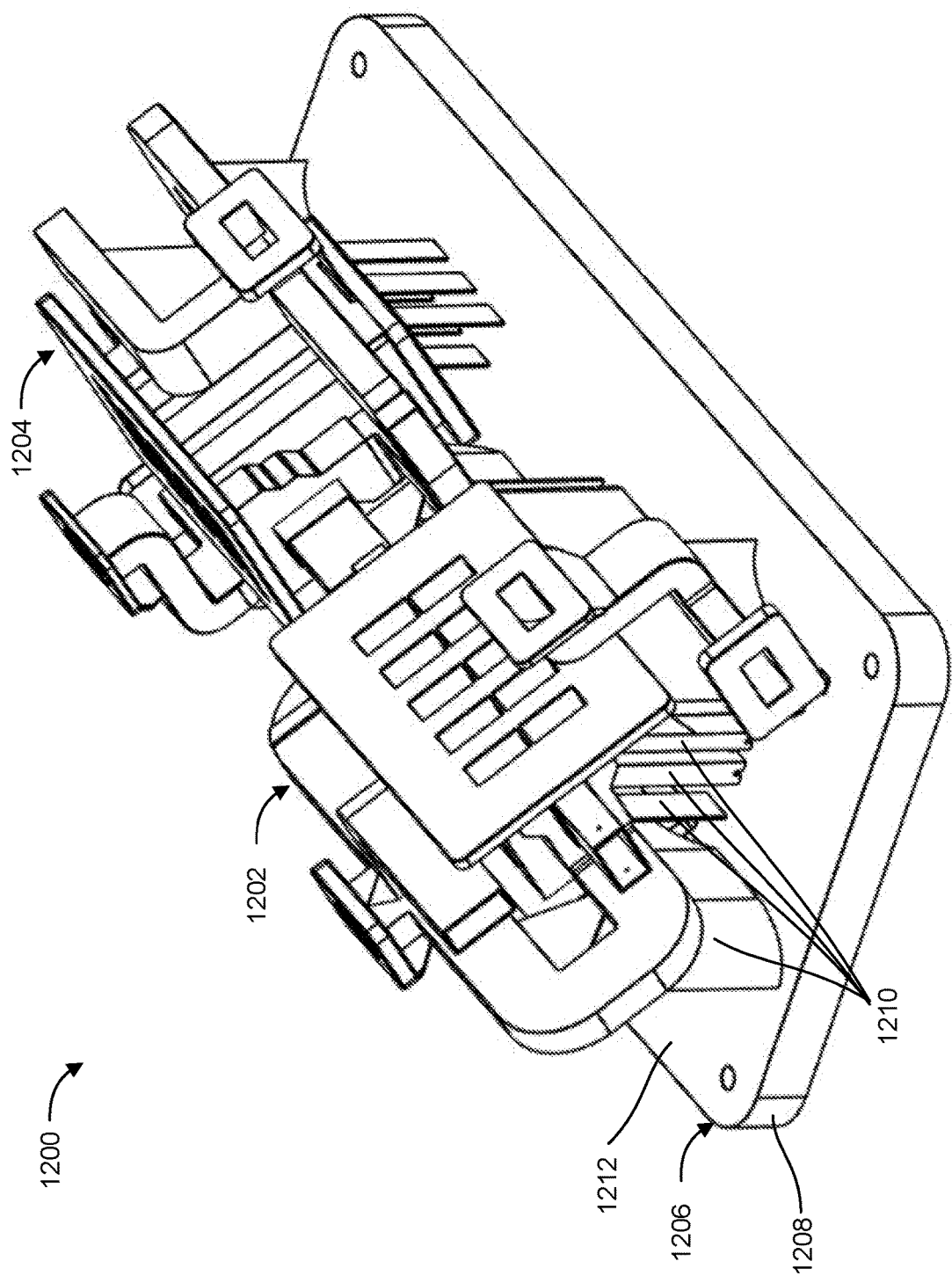
FIG. 12 illustrates a build plate for manufacturing a plurality of waveguides after the manner of the waveguide shown in FIG. 1A in accordance with examples of the present disclosure.

The manner and method of manufacturing the waveguide will be described with reference to FIGS. 12-14. FIG. 12 illustrates an isometric view of an additive manufacturing system 1200 for manufacturing a waveguide 1202 and a waveguide 1204, which can comprise any of the waveguide examples discussed herein, such as those with respect to FIGS. 1A-11B. The system 1200 can comprise a build plate 1206 having a base 1208 and a plurality of build surfaces 1210 on which the waveguides 1202 and 1204 are formed. In additive manufacturing of the waveguides, the method can comprise providing the build plate having one or more build surfaces for forming the waveguides 1202 and 1204. The method can further comprise successively layering material on the build plate in a build direction normal to a surface 1212 of the base 1208 of the base plate 1206.

The method can further comprise forming a channel comprising an outer wall defining an inner cavity configured to propagate electromagnetic waves. The method can further comprise, forming a filter disposed in the inner cavity of the channel, the filter comprising a perimeter edge, an aperture, and a downward facing surface relative to the base of the build plate. The method can further comprise forming a support bridge comprising a first interface connected to an inner surface of the outer wall at a first location, and a second interface connected to the filter at a position between the perimeter edge of the filter and the aperture in the filter to support the downward facing surface of the filter within the channel. During successive layering of material on the build plate, steps of forming each component of a waveguide as described in this disclosure can be carried out. Furthermore, the method can comprise forming a thickened band of material around the outside of the waveguide. The thickened band will be described in more detail below with reference to FIG. 14.

FIG. 13 illustrates a side view of the waveguides 1202 and 1204 on the build surfaces 1210 of build plate 1206. A build direction BD in which material is successively layered on the build plate 1206 is shown in FIG. 13. The build direction BD can be parallel to the pull of gravity and is normal to a surface of the base 1206. As shown, the build surfaces and the waveguides 1202 and 1204 are oriented at angles with respect to the build direction BD. For example, the build surfaces and waveguides 1202 and 1204 can be substantially oriented at a build angle BA of 45 degrees.

Angling the build surfaces 1210 and waveguides 1202 and 1204 during successive layering of material in an additive manufacturing process acts to decrease build defects and deformation during printing. When a surface is printed that is aligned with the build direction, the surface can be manufactured with little defects because layers of material are added directly on top of each other in the build direction BD. However, deformations can be generated during the layering of an additive manufacturing fabrication when surfaces of a part being manufactured are angled relative to the build direction BD. Particularly, downward facing surfaces that face toward the base 1208, such that the surface normal of the part directly points in a direction of the surface normal 1212 of the base 1208, can have significant manufacturing defects due to the pull of gravity. Furthermore, manufacturing defects can also result from the thermal effects of the additive manufacturing process such as, for example, Powder bed fusion (PBF). In thermal additive manufacturing processes such as PBF, plates and sections with downward facing surfaces having insufficient support can suffer from distortion due to poor thermal energy migration within the section. Whilst the feature may physically resolve, poor thermal energy migration caused by insufficient support can cause the part to warp, which in waveguide manufacturing and operation is undesirable.

For example, due to the pull of gravity, forming surfaces parallel to the base 1208 can cause significant mechanical defects such as warping, collapse, breakage, or others unless elements are provided to support the part being manufactured. Such defects tends to occur at locations where one or more walls of the component being manufactured encounters a significant transition (e.g., an angle approaching 0° or parallel to the base 1208) in the build direction. As surfaces approach being oriented parallel to the build direction BD from being perpendicular to the build direction, stability of surfaces improves and manufacturing defects are decreased. Therefore, it is desirable to maintain the angles between different surfaces within a prescribed range of 45°+/−25° to prevent defects from occurring.

Figure 13A:
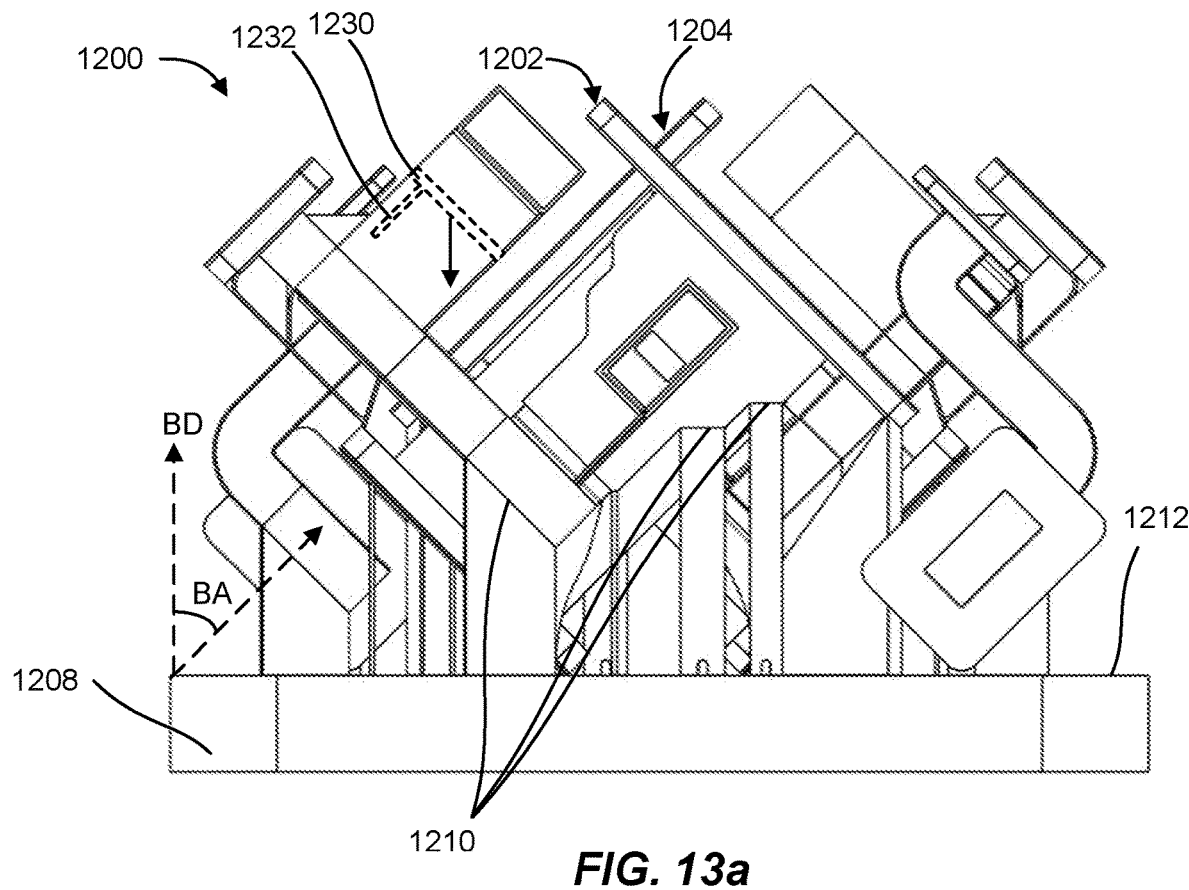
FIGS. 13A and 13B illustrate side views of the waveguide of FIG. 1A both on and off of the build plate.
Figure 13B:
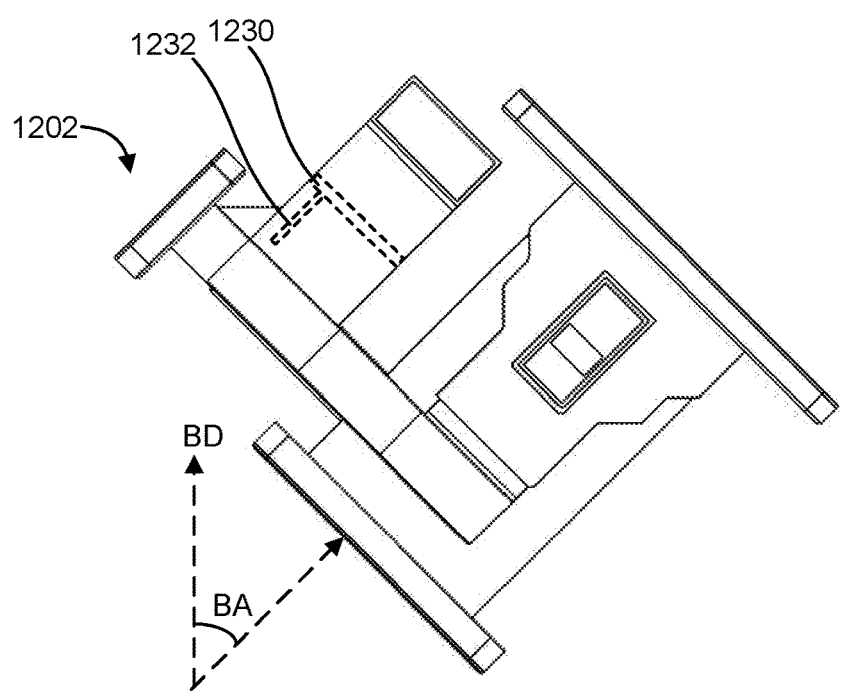

At 45° orientations, such as build angle BA in FIG. 13b, manufacturing defects are reduced and waveguides can be manufactured with more reliability and predictability. However, depending on the shape and configuration of the part, manufacturing defects can still be prevalent at a build angle BA of 45°. For example, the filter 130 having the plate 134 with the aperture 136 formed therein can be more susceptible to breakage and warping due to the aperture 136 compromising structural integrity. As illustrated in FIG. 13a, the filter 1230, outlined in a dotted line in waveguide 1202, has a surface that is at least partially downward facing toward base 1208. The downward facing nature of the filter 1230 leaves the filter 1230 susceptible to manufacturing defects and build failure. The bridging length of the filter 1230 with the aperture formed therein could cause significant distortion and lead to build failure.

To protect against deformation, support bridge 1232 can be formed to support the filter 1230 within the channel of the waveguide 1202. This will support the generation of the critical dimensions of the aperture whilst not hindering its performance. The bridge will not have to be mechanically removed during post processing. The filter 1230, support bridge 1232, and waveguide 1202 can be formed according to any of the examples described in this disclosure.

Certain waveguides operating in high frequency ranges are often small in size and can easily be manufactured using additive manufacturing. However, larger format waveguides, such as C-band waveguides, are larger and require larger additive manufacturing devices to be manufactured. Larger waveguides and manufacturing devices give rise to unique problems in the manufacturing of waveguides.

For example, a possible additive manufacturing process includes a Powder Bed Fusion (PBF) process that can include commonly used printing techniques such as direct metal laser sintering (DMLS), electron beam melting (EBM), selective heat sintering (SHS), selective laser melting (SLM) and selective laser sintering (SLS). Such PBF methods use heating elements as print sources such as a laser or electron beam to melt and fuse material powder together. The process sinters the powder, layer by layer until the full part is complete. Similar operations can be carried out with any other manufacturing methods known in additive manufacturing. As used herein, "print source" can refer to inkjets, binding jets, extruders, lasers, electron beams, print heads, or other heating devices to produce, extrude, melt, and fuse material known in additive manufacturing.

In larger scale additive manufacturing systems, two or more print sources can be required to cover a full range of the part being produced in the system. In cases in which multiple print sources are utilized, each print source can print in a print region individual to the specific print source and can print in a common region that is common to both of the two or more print sources.

Figure 14:
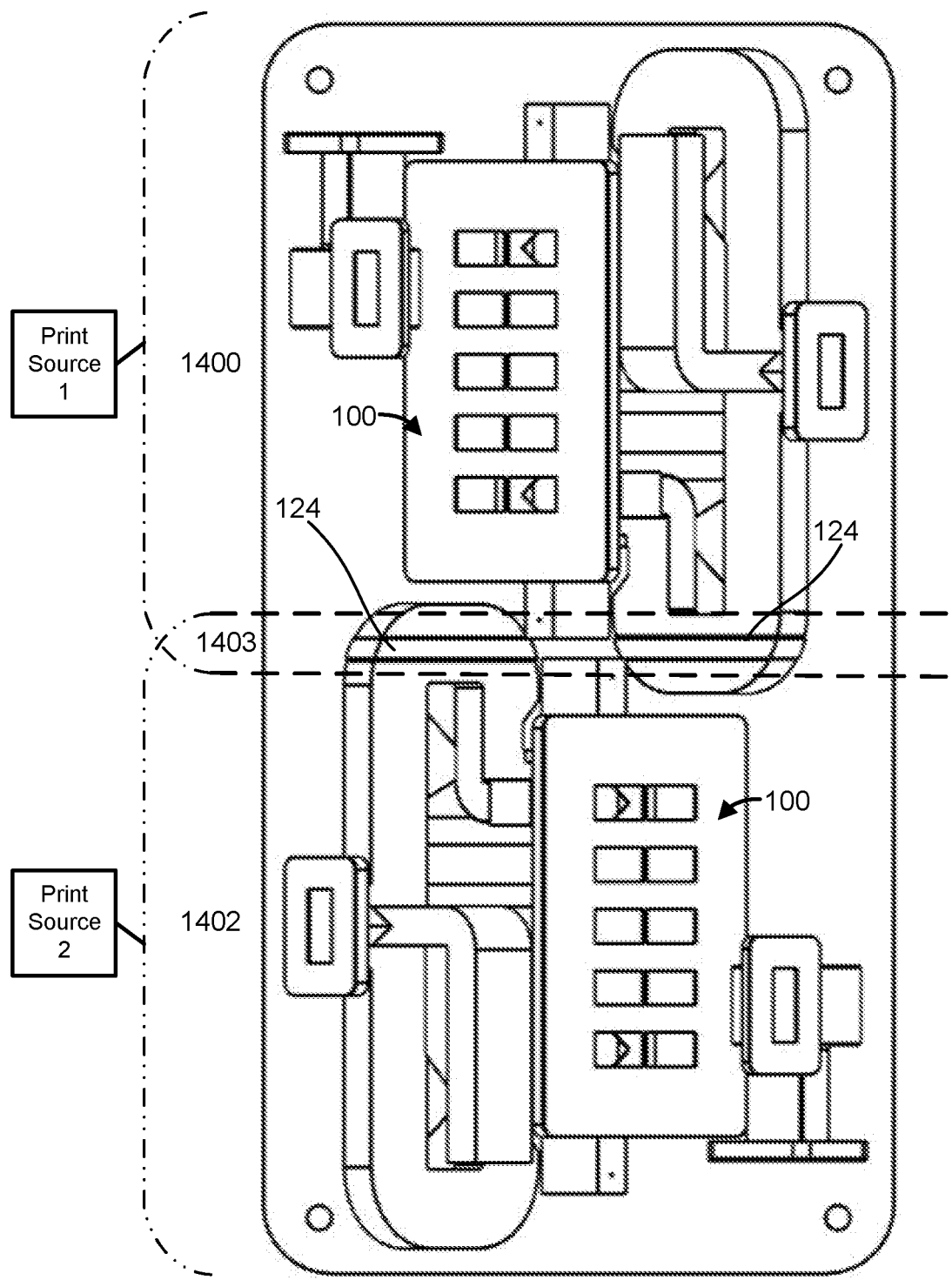
FIG. 14 illustrates a top view of the build plate of FIG. 12.

FIG. 14 illustrates printing ranges of an additive manufacturing system with two print sources (i.e., print sources 1 and 2). Print sources 1 and 2 can operate to print two monolithic, single material, isotropic waveguides 100 by an additive manufacturing process. As shown, print source 1 can print over a print range 1400. Print source 2 can print over print range 1402. In a small section, both print range 1400 and print range 1402 can overlap. This region where the print sources overlap is called a stitch region 1403. In this stitch region 1403, printing of a single part is carried out by two print sources and the separate printing of each print source is "stitched" together to form a single part.

Misalignment of the print sources 1 and 2 can be detrimental to the manufacture of a waveguide. If print sources 1 and 2 are misaligned or if the precision of one or more of the print sources is off, there is a risk that multiple print sources can print in an area where only one print source is intended to form the part, thus leading to an unintended excess of material and deformation on the part in the misaligned sections. Alternatively, all of the print sources, due to misalignment, can fail to form the waveguide in a certain area of the stitch region, thereby leaving unintended gaps, voids, and openings in the waveguide walls where the walls are intended to be closed. Additionally, misalignment can lead to undesirable witness lines, protrusions, and other defects that can affect the appearance and function of the waveguide. Therefore, misalignment of print sources can adversely affect the manufacture and performance of the waveguide.

The waveguide 100 can comprise a design meant to ensure that a complete waveguide is produced, without manufacturing defects, when manufactured in additive systems comprising multiple print sources. For example, waveguide 100 can further comprise a thickened band 124 around the outer wall of the waveguide that is thicker than other walls of the waveguide. The band 124 can be disposed in a part of the waveguide 100 that is formed in the stitch region 1403 of the additive manufacturing system common to the two or more print sources. In the case of misalignment of print sources, printing the thickened band 124 of material can ensure that the waveguide is properly stitched together, with redundant material added to complete formation of the wave guide and close any gaps, voids, and to smooth any witness lines that can be formed in the additive manufacturing. Therefore, even with misalignment of print sources, the waveguide can be reliably and consistently printed without defects.

While concepts in this disclosure are described with reference to C-band and other large format waveguides, it will be understood that the principles, structures, and methods described herein can be applied to waveguides that operate to propagate any known frequency/wavelength of electromagnetic waves. The disclosure is not intended to be limited in any way to waveguides of certain operating ranges. Indeed, the disclosure can be applicable to other waveguides, such as S-band, X-band, or other waveguide types.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for additively manufacturing a waveguide utilizing an additive manufacturing system, the method comprising:
   providing a build plate comprising a base, and one or more build surfaces oriented on an angle relative to the base;
   successively layering material on the build plate in a build direction normal to a surface of the base, wherein the successive layering comprises:
   forming a channel comprising an outer wall defining an inner cavity configured to propagate electromagnetic waves;
   forming a filter disposed in the inner cavity of the channel, the filter comprising a perimeter edge, an aperture, and a downward facing surface relative to the base of the build plate; and
   forming a support bridge comprising a first interface connected to an inner surface of the outer wall at a first location, and a second interface connected to the filter at a position between the perimeter edge of the filter and the aperture in the filter to support the downward facing surface of the filter within the channel.

2. The method of claim 1, wherein the additive manufacturing system comprises two or more print sources that each print in a region common to the two or more print sources, and wherein the method further comprises forming a band around the outer wall in a stitch region of the waveguide that is configured to be printed in the region common to the two or more print sources.

3. The method of claim 1, wherein the one or more build surfaces are oriented at 45 degrees with respect to the base.

4. The method of claim 1, further comprising forming the support bridge to remain in place during operation of the waveguide.

5. The method of claim 1, further comprising forming a plurality of support bridges, including the support bridge, each comprising a first interface connected to an inner surface of the outer wall at respective locations, and a second interface connected to the filter at a position between the perimeter edge and the aperture of the filter to support the filter within the channel, wherein the plurality of support bridges are offset from one another.

6. The method of claim 1, wherein the waveguide is monolithic.

7. The method of claim 1, wherein the filter is an iris filter comprising a plate with the aperture formed therein and the second interface of the support bridge is connected to the plate.

8. The method of claim 1, further comprising:
   configuring the support bridge to further comprise a third interface connected to the inner surface of the outer wall at a second location.

9. The method of claim 1, further comprising:
   forming a transition surface between the first interface and the inner surface, and a transition surface between the second interface and the filter.

10. The method of claim 8, further comprising:
    forming a transition surface between the third interface and the inner surface.

11. The method of claim 1, wherein the channel comprises a substantially rectangular cross section, the outer wall comprising four sides configured in a rectangular shape.

* * * * *

UNITED STATES PATENT AND TRADEMARK OFFICE
CERTIFICATE OF CORRECTION

| | | |
|---|---|---|
| PATENT NO. | : 12,444,818 B2 | Page 1 of 1 |
| APPLICATION NO. | : 18/072539 | |
| DATED | : October 14, 2025 | |
| INVENTOR(S) | : Benedict et al. | |

It is certified that error appears in the above-identified patent and that said Letters Patent is hereby corrected as shown below:

In the Specification

In Column 8, Line 21, delete "136" and insert --130-- therefor

In Column 9, Line 55, delete "132" and insert --130-- therefor

In Column 11, Line 23, delete "1132" and insert --1132$b$-- therefor

In Column 11, Line 40, delete "1136" and insert --1130-- therefor

In Column 12, Line 26, delete "1206." and insert --1208.-- therefor

Signed and Sealed this
Sixteenth Day of December, 2025

John A. Squires
*Director of the United States Patent and Trademark Office*